US009846601B2

(12) United States Patent
Li et al.

(10) Patent No.: US 9,846,601 B2
(45) Date of Patent: Dec. 19, 2017

(54) METHOD AND APPARATUSES FOR DETERMINING A LEAK OF RESOURCE AND PREDICTING USAGE OF RESOURCE

(71) Applicant: Huawei Technologies Co., Ltd., Shenzhen (CN)

(72) Inventors: Jinghui Li, Shenzhen (CN); Xuewen Gong, Shenzhen (CN); Jianqing Yuan, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 86 days.

(21) Appl. No.: 14/922,595

(22) Filed: Oct. 26, 2015

(65) Prior Publication Data

US 2016/0041848 A1 Feb. 11, 2016

Related U.S. Application Data

(63) Continuation of application No. PCT/CN2014/080271, filed on Jun. 19, 2014.

(30) Foreign Application Priority Data

May 21, 2013 (CN) .......................... 2013 1 0190659

(51) Int. Cl.
*G06F 9/50* (2006.01)
*G06F 11/00* (2006.01)
(Continued)

(52) U.S. Cl.
CPC .......... *G06F 9/5055* (2013.01); *G06F 11/008* (2013.01); *G06F 11/3037* (2013.01); *G06F 11/3409* (2013.01); *G06F 2201/81* (2013.01)

(58) Field of Classification Search
None
See application file for complete search history.

(56) References Cited

U.S. PATENT DOCUMENTS 6,691,067 B1\* 2/2004 Ding .................. G06F 11/3447
702/186
6,993,458 B1 1/2006 Castelli et al.
(Continued)

FOREIGN PATENT DOCUMENTS

CN 1766847 A 5/2006
CN 1774095 A 5/2006
(Continued)

OTHER PUBLICATIONS

Partial English Translation and Abstract of Chinese Patent Application No. CN101539870, Jan. 30, 2016, 5 pages.
(Continued)

*Primary Examiner* — Abu Ghaffari
(74) *Attorney, Agent, or Firm* — Conley Rose, P.C.

(57) ABSTRACT

A method and an apparatus for determining a leak of a program running resource are disclosed that relate to the field of computer applications. The method for predicting a usage condition of a program running resource includes collecting program running resource usage at least once within each program running resource usage period; decomposing the collected program running resource usage into different resource components; for data contained in each resource component, determining a prediction function for the resource component; determining an overall prediction function for a program running resource according to the determined prediction functions for all the resource components; and predicting a usage condition of the program running resource based on the determined overall prediction function.

46 Claims, 9 Drawing Sheets

(51) Int. Cl.
*G06F 11/30* (2006.01)
*G06F 11/34* (2006.01)

(56) References Cited

U.S. PATENT DOCUMENTS

| | | | | |
|---|---|---|---|---|
| 7,293,142 | B1* | 11/2007 | Xu | G06F 11/3648 707/999.202 |
| 7,730,364 | B2* | 6/2010 | Chang | G06F 11/008 714/47.2 |
| 8,312,062 | B1* | 11/2012 | Spivak | G06F 9/5022 707/813 |
| 8,793,289 | B2* | 7/2014 | Topchiyski | G06F 11/0709 707/813 |
| 2002/0144178 | A1 | 10/2002 | Castelli et al. | |
| 2003/0139905 | A1* | 7/2003 | Helsper | G06F 11/3006 702/182 |
| 2005/0091646 | A1* | 4/2005 | Chilimbi | G06F 11/3636 717/130 |
| 2005/0235127 | A1 | 10/2005 | Muthiah et al. | |
| 2006/0265713 | A1* | 11/2006 | Depro | G06F 11/3409 718/104 |
| 2007/0067758 | A1 | 3/2007 | Findeisen et al. | |
| 2007/0136402 | A1* | 6/2007 | Grose | G06F 12/0253 |
| 2007/0271418 | A1* | 11/2007 | Sridharan | G06F 11/0748 711/146 |
| 2008/0301504 | A1* | 12/2008 | Chen | G06F 11/008 714/42 |
| 2009/0328007 | A1 | 12/2009 | Chen et al. | |
| 2010/0070974 | A1* | 3/2010 | Inoue | G06F 9/5016 718/101 |
| 2012/0216076 | A1* | 8/2012 | Macik | G06F 11/3612 714/38.1 |
| 2013/0145220 | A1* | 6/2013 | Lv | G06F 11/073 714/47.1 |
| 2013/0211762 | A1* | 8/2013 | Taskov | G06F 11/366 702/88 |

FOREIGN PATENT DOCUMENTS

| | | |
|---|---|---|
| CN | 101539870 A | 9/2009 |
| CN | 101599048 A | 12/2009 |
| CN | 101615143 A | 12/2009 |
| CN | 102200943 A | 9/2011 |
| EP | 2515233 A1 | 10/2012 |
| WO | 03054704 A1 | 7/2003 |
| WO | 2012122672 A1 | 9/2012 |

OTHER PUBLICATIONS

Partial English Translation and Abstract of Chinese Patent Application No. CN101599048, Jan. 30, 2016, 6 pages.

"Network Functions Virtualisation (NFV) Resiliency Requirements," ETSI GS NFV-REL 001, V1.1.1, Jan. 2015, 82 pages.

Foreign Communication From a Counterpart Application, PCT Application No. PCT/CN2014/080271, English Translation of International Search Report dated Sep. 29, 2014, 2 pages.

Foreign Communication From a Counterpart Application, PCT Application No. PCT/CN2014/080271, English Translation of Written Opinion dated Sep. 29, 2014, 7 pages.

Muskens, J., et al., "Prediction of Run-Time Resource Consumption in Multi-Task Component-Based Software System," Lecture Notes in Computer Science, 3054, 2004, pp. 162-177.

Foreign Communication From a Counterpart Application, European Application No. 14801434.3, Extended European Search Report dated May 10, 2016, 7 pages.

* cited by examiner

METHOD AND APPARATUSES FOR DETERMINING A LEAK OF RESOURCE AND PREDICTING USAGE OF RESOURCE

CROSS-REFERENCE TO RELATED APPLICATIONS

This application is a continuation of International Application No. PCT/CN2014/080271, filed on Jun. 19, 2014, which claims priority to Chinese Patent Application No. 201310190659.3, filed on May 21, 2013, both of which are hereby incorporated by reference in their entireties.

TECHNICAL FIELD

The present disclosure relates to the computer application field, and in particular, to a method and an apparatus for determining a leak of a program running resource and a method and an apparatus for predicting a usage condition of a program running resource.

BACKGROUND

A program running resource such as memory, a file handle, a semaphore, a database connection pool, or a thread pool is a critical resource needed when a program runs. During running, a program applies for a resource when needing to use a program running resource and releases the occupied program running resource in time when the use ends. If the occupied program running resource is not released in time, a program running resource a leak problem occurs. The program running resource a leak problem is described below using memory leak as an example.

Memory leak refers to that a design or encoding problem causes a program not to release in time memory that is no longer used, resulting in increasingly less memory available in a system. With long time running of the program, memory leak becomes increasingly severe, and eventually a service is damaged or interrupted because of insufficient memory in the system. Memory leak is a problem that occurs easily and is difficult to avoid during program running. As software becomes increasingly large in scale and increasingly complex, a probability of occurrence of memory leak in a system also becomes increasingly high.

For the memory leak problem, one of the existing methods of detecting memory leak is a static analysis method. In this method, a program does not need to be run, and instead program code is analyzed manually or using an automatic tool, to examine matching between allocation and release of memory in the code. In a case of a relatively simple correspondence between allocation and release of memory, the static analysis method can usually effectively detect potential memory leak; however, in a case of a relatively complex correspondence between allocation and release of memory, for example, allocation of memory in one function and release of the corresponding memory in one or even more other functions, an error is easily reported falsely or not reported in the static analysis method an error is easily reported falsely or not reported.

Another existing method of detecting memory leak is to detect memory leak by dynamically monitoring allocation and release of memory during program running in combination with determining of a life cycle of memory. On one hand, the method needs to manage allocation and release of all related memory in a program and needs to accurately determine a life cycle of memory, resulting in complex implementation and large impact on system performance. On the other hand, to implement takeover of a memory allocation function and a release function, a corresponding code modification needs to be made according to a specific application program, and determining of a life cycle of a memory also depends on a specific application scenario; therefore, the method is closely related to a specifically detected target system, and is relatively not overall.

In addition, in the prior art it can only be detected whether there is memory leak; a prediction cannot be provided for a future memory usage condition, for example, time when memory is to be exhausted or time when memory usage is to reach a set threshold.

SUMMARY

Embodiments of the present disclosure provide a method and an apparatus for determining a leak of a program running resource, so as to solve problems in an existing method of detecting a leak of a program running resource that an error is easily reported falsely or not reported, system performance is greatly affected, and the method is not overall.

According to a first aspect, a method for determining a leak of a program running resource is provided, including collecting program running resource usage at least once within each program running resource usage period, where the number of times of collecting program running resource usage is the same within each program running resource usage period, and the program running resource usage period is a period that is set according to a periodicity law of program running resource usage; for any two program running resource usage periods, determining a difference value between program running resource usage collected each time within the latter period and program running resource usage collected for a corresponding sequence number within the former period, where a time difference between time when collection is performed each time within the latter period and start time of the latter period and a time difference between time when collection is performed for a corresponding sequence number within the former period and start time of the former period fall within a preset range; and determining whether there is a leak of a program running resource according to a difference between the total number of difference values greater than 0 and the total number of difference values less than 0 among the determined difference values.

With reference to the first aspect, in a first possible implementation manner, the preset range is a duration range smaller than a minimum time interval among time intervals between every two adjacent times of collection within the former period, or, the preset range is a duration range smaller than a minimum time interval among time intervals between every two adjacent times of collection within the latter period.

With reference to the first aspect, in a second possible implementation manner, before the determining a difference value between program running resource usage collected each time within the latter period and program running resource usage collected for a corresponding sequence number within the former period, the method further includes determining that the total number of periods or the total number of times of collecting program running resource usage is not less than a set threshold, and/or a current program running resource occupancy rate is not less than a set threshold, and/or a current central processing unit (CPU) occupancy rate is less than a set threshold, and/or current time falls within a set time range.

With reference to the first aspect or the second possible implementation manner of the first aspect, in a third possible implementation manner, the determining whether there is a leak of a program running resource according to a difference between the total number of difference values greater than 0 and the total number of difference values less than 0 includes, if the difference between the total number of difference values greater than 0 and the total number of difference values less than 0 is greater than a set threshold, determining that there is a leak of a program running resource.

With reference to the third possible implementation manner of the first aspect, in a fourth possible implementation manner, a range of the threshold is greater than or equal to 0, and is less than or equal to 70% of a sum of the total number of difference values greater than 0 and the total number of difference values less than 0 among the determined difference values.

With reference to the first aspect or the second possible implementation manner of the first aspect, in a fifth possible implementation manner, the determining whether there is a leak of a program running resource according to a difference between the total number of difference values greater than 0 and the total number of difference values less than 0 includes determining a statistic Z of the difference between the total number of difference values greater than 0 and the total number of difference values less than 0; and if Z is greater than a set threshold, determining that there is a leak of a program running resource.

With reference to the fifth possible implementation manner of the first aspect, in a sixth possible implementation manner, the statistic Z of the difference S' between the total number of difference values greater than 0 and the total number of difference values less than 0 is determined according to the following formula:

if $$n \geq 10, Z = \frac{S'}{[\text{VAR}(S')]^{1/2}},$$

where n is the number of program running resource usage periods;

otherwise, $$Z = \begin{cases} \frac{(S'-1)}{[\text{VAR}(S')]^{1/2}}, & S' > 0 \\ 0, & S' = 0, \\ \frac{(S'+1)}{[\text{VAR}(S')]^{1/2}}, & S' < 0 \end{cases}$$

where $$S_i = \sum_{k=1}^{n-1} \sum_{l=k+1}^{n} \text{sgn}(R_{il} - R_{ik}),$$

$$S' = \sum_{i=1}^{m} S_i,$$

$$\text{VAR}(S') = \sum_{i=1}^{m} \text{VAR}(S_i),$$

$R_{ik}$ is program running resource usage collected for an $i^{th}$ time within a $k^{th}$ program running resource usage period, $R_{il}$ is program running resource usage collected for an $i^{th}$ time within a 1st program running resource usage period, and m is the number of times of collecting program running resource usage within one program running resource usage period.

With reference to the fifth possible implementation manner of the first aspect, in a seventh possible implementation manner, the threshold is a quantile value determined according to a probability distribution of the statistic Z.

According to a second aspect, an apparatus for determining a leak of a program running resource is provided, including a collecting module configured to collect program running resource usage at least once within each program running resource usage period, and transmit the collected program running resource usage to a determining module, where the number of times of collecting program running resource usage is the same within each program running resource usage period, and the program running resource usage period is a period that is set according to a periodicity law of program running resource usage; the determining module configured to receive the program running resource usage that is collected by the collecting module each time, and for any two program running resource usage periods, determine a difference value between program running resource usage collected each time within the latter period and program running resource usage collected for a corresponding sequence number within the former period, and transmit the determined difference values to a judging module, where a time difference between time when collection is performed each time within the latter period and start time of the latter period and a time difference between time when collection is performed for a corresponding sequence number within the former period and start time of the former period fall within a preset range; and the judging module configured to receive the difference values determined by the determining module, and determine whether there is a leak of a program running resource according to a difference between the total number of difference values greater than 0 and the total number of difference values less than 0 among the determined difference values.

With reference to the second aspect, in a first possible implementation manner, the preset range is a duration range smaller than a minimum time interval among time intervals between every two adjacent times of collection within the former period, or, the preset range is a duration range smaller than a minimum time interval among time intervals between every two adjacent times of collection within the latter period.

With reference to the second aspect, in a second possible implementation manner, the judging module is configured to, if the difference between the total number of difference values greater than 0 and the total number of difference values less than 0 is greater than a set threshold, determine that there is a leak of a program running resource.

With reference to the second possible implementation manner of the second aspect, in a third possible implementation manner, a range of the threshold is greater than or equal to 0, and is less than or equal to 70% of a sum of the total number of difference values greater than 0 and the total number of difference values less than 0 among the determined difference values.

With reference to the second aspect, in a fourth possible implementation manner, the judging module is configured to determine a statistic Z of the difference between the total number of difference values greater than 0 and the total number of difference values less than 0; and, if Z is greater than a set threshold, determine that there is a leak of a program running resource.

With reference to the fourth possible implementation manner of second aspect, in a fifth possible implementation manner, the judging module is configured to determine the statistic Z of the difference S' between the total number of difference values greater than 0 and the total number of difference values less than 0 according to the following formula:
if $$n \geq 10, Z = \frac{S'}{[VAR(S')]^{1/2}},$$

where n is the number of program running resource usage periods;
otherwise, $$Z = \begin{cases} \frac{(S'-1)}{[VAR(S')]^{1/2}}, & S' > 0 \\ 0, & S' = 0, \\ \frac{(S'+1)}{[VAR(S')]^{1/2}}, & S' < 0 \end{cases}$$

where $$S_i = \sum_{k=1}^{n-1} \sum_{l=k+1}^{n} \mathrm{sgn}(R_{il} - R_{ik}),$$

$$S' = \sum_{i=1}^{m} S_i,$$

$$VAR(S') = \sum_{i=1}^{m} VAR(S_i),$$

$R_{ik}$ is program running resource usage collected for an $i^{th}$ time within a $k^{th}$ program running resource usage period, $R_{il}$ is program running resource usage collected for an $i^{th}$ time within a 1st program running resource usage period, and m is the number of times of collecting program running resource usage within one program running resource usage period.

With reference to the fourth possible implementation manner of the second aspect, in a sixth possible implementation manner, the threshold is a quantile value determined according to a probability distribution of the statistic Z.

According to a third aspect, an apparatus for determining a leak of a program running resource is provided, including a processor configured to collect program running resource usage at least once within each program running resource usage period, where the number of times of collecting program running resource usage is the same within each program running resource usage period; for any two program running resource usage periods, determine a difference value between program running resource usage collected each time within the latter period and program running resource usage collected for a corresponding sequence number within the former period, where a time difference between time when collection is performed each time within the latter period and start time of the latter period and a time difference between time when collection is performed for a corresponding sequence number within the former period and start time of the former period fall within a preset range; and determine whether there is a leak of a program running resource according to a difference between the total number of difference values greater than 0 and the total number of difference values less than 0 among the determined difference values, where the program running resource usage period is a period that is set according to a periodicity law of program running resource usage; and a memory configured to store the program running resource usage that is collected by the processor each time and the determined difference value between the program running resource usage collected each time within the latter period and the program running resource usage collected the corresponding time within the former period.

According to a fourth aspect, a method for determining a leak of a program running resource is provided, including collecting program running resource usage at least once within each program running resource usage period, where the number of times of collecting program running resource usage is the same within each program running resource usage period, and the program running resource usage period is a period that is set according to a periodicity law of program running resource usage; for every two program running resource usage periods, determining a difference value between program running resource usage collected each time within the latter period and program running resource usage collected for a corresponding sequence number within the former period, where a time difference between time when collection is performed each time within the latter period and start time of the latter period and a time difference between time when collection is performed for a corresponding sequence number within the former period and start time of the former period fall within a preset range, and the preset range is a duration range smaller than a minimum time interval among time intervals between every two adjacent times of collection within the former period, or, the preset range is a duration range smaller than a minimum time interval among time intervals between every two adjacent times of collection within the latter period; and if a difference between the total number of difference values greater than 0 and the total number of difference values less than 0 among the determined difference values is greater than a set threshold, determining that there is a leak of a program running resource, where a range of the threshold is greater than or equal to 0, and is less than or equal to 70% of a sum of the total number of difference values greater than 0 and the total number of difference values less than 0 among the determined difference values.

According to a fifth aspect, a method for determining a leak of a program running resource is provided, including collecting program running resource usage at least once within each program running resource usage period, where the number of times of collecting program running resource usage is the same within each program running resource usage period, and the program running resource usage period is a period that is set according to a periodicity law of program running resource usage; for every two program running resource usage periods, determining a difference value between program running resource usage collected each time within the latter period and program running resource usage collected for a corresponding sequence number within the former period, where a time difference between time when collection is performed each time within the latter period and start time of the latter period and a time difference between time when collection is performed for a corresponding sequence number within the former period and start time of the former period fall within a preset range, and the preset range is a duration range smaller than a minimum time interval among time intervals between every two adjacent times of collection within the former period, or, the preset range is a duration range smaller than a minimum time interval among time intervals between every two adjacent times of collection within the latter period; determining a statistic Z of a difference between the total number of difference values greater than 0 and the total number of difference values less than 0; and if Z is greater than a set threshold, determining that there is a leak of a program running resource, where the statistic Z of the difference S' between the total number of difference values greater than 0 and the total number of difference values less than 0 is determined according to the following formula:

if $$n \geq 10, Z = \frac{S'}{[VAR(S')]^{1/2}},$$

where n is the number of program running resource usage periods;

otherwise, $$Z = \begin{cases} \frac{(S'-1)}{[VAR(S')]^{1/2}}, & S' > 0 \\ 0, & S' = 0 \\ \frac{(S'+1)}{[VAR(S')]^{1/2}}, & S' < 0 \end{cases}$$

where $$S_i = \sum_{k=1}^{n-1} \sum_{l=k+1}^{n} \text{sgn}(R_{il} - R_{ik}),$$

$$S' = \sum_{i=1}^{m} S_i,$$

$$VAR(S') = \sum_{i=1}^{m} VAR(S_i),$$

$R_{ik}$ is program running resource usage collected for an $i^{th}$ time within a $k^{th}$ program running resource usage period, $R_{il}$ is program running resource usage collected for an $i^{th}$ time within a 1st program running resource usage period, and m is the number of times of collecting program running resource usage within one program running resource usage period; and wherein the threshold is a quantile value determined according to a probability distribution of the statistic Z.

According to a sixth aspect, an apparatus for determining a leak of a program running resource is provided, including a collecting module configured to collect program running resource usage at least once within each program running resource usage period, where the number of times of collecting program running resource usage is the same within each program running resource usage period, and the program running resource usage period is a period that is set according to a periodicity law of program running resource usage; a determining module configured to, for every two program running resource usage periods, determine a difference value between program running resource usage collected each time within the latter period and program running resource usage collected for a corresponding sequence number within the former period, where a time difference between time when collection is performed each time within the latter period and start time of the latter period and a time difference between time when collection is performed for a corresponding sequence number within the former period and start time of the former period fall within a preset range, and the preset range is a duration range smaller than a minimum time interval among time intervals between every two adjacent times of collection within the former period, or, the preset range is a duration range smaller than a minimum time interval among time intervals between every two adjacent times of collection within the latter period; and a judging module configured to, when a difference between the total number of difference values greater than 0 and the total number of difference values less than 0 among the determined difference values is greater than a set threshold, determine that there is a leak of a program running resource, where a range of the threshold is greater than or equal to 0, and is less than or equal to 70% of a sum of the total number of difference values greater than 0 and the total number of difference values less than 0 among the determined difference values.

According to a seventh aspect, an apparatus for determining a leak of a program running resource is provided, including a collecting module configured to collect program running resource usage at least once within each program running resource usage period, where the number of times of collecting program running resource usage is the same within each program running resource usage period, and the program running resource usage period is a period that is set according to a periodicity law of program running resource usage; a determining module configured to, for every two program running resource usage periods, determine a difference value between program running resource usage collected each time within the latter period and program running resource usage collected for a corresponding sequence number within the former period, where a time difference between time when collection is performed each time within the latter period and start time of the latter period and a time difference between time when collection is performed for a corresponding sequence number within the former period and start time of the former period fall within a preset range, and the preset range is a duration range smaller than a minimum time interval among time intervals between every two adjacent times of collection within the former period, or, the preset range is a duration range smaller than a minimum time interval among time intervals between every two adjacent times of collection within the latter period; and a judging module configured to determine a statistic Z of a difference between the total number of difference values greater than 0 and the total number of difference values less than 0, and if Z is greater than a set threshold, determine that there is a leak of a program running resource, where the judging module is configured to determine the statistic Z of the difference S' between the total number of difference values greater than 0 and the total number of difference values less than 0 according to the following formula:

if $$n \geq 10, Z = \frac{S'}{[VAR(S')]^{1/2}},$$

where n is the number of program running resource usage periods;

otherwise, $$Z = \begin{cases} \frac{(S'-1)}{[VAR(S')]^{1/2}}, & S' > 0 \\ 0, & S' = 0, \\ \frac{(S'+1)}{[VAR(S')]^{1/2}}, & S' < 0 \end{cases}$$

where $$S_i = \sum_{k=1}^{n-1} \sum_{l=k+1}^{n} \text{sgn}(R_{il} - R_{ik}),$$

$$S' = \sum_{i=1}^{m} S_i,$$

$$VAR(S') = \sum_{i=1}^{m} VAR(S_i),$$

$R_{ik}$ is program running resource usage collected for an $i^{th}$ time within a $k^{th}$ program running resource usage period, $R_{il}$ is program running resource usage collected for an $i^{th}$ time within a 1st program running resource usage period, and m is the number of times of collecting program running resource usage within one program running resource usage period; and wherein the threshold is a quantile value determined according to a probability distribution of the statistic Z.

According to the method for determining a leak of a program running resource provided in the first aspect or the fourth aspect or the fifth aspect and the apparatus for determining a leak of a program running resource provided in the second aspect or the third aspect or the sixth aspect or the seventh aspect, by using the embodiments of the present disclosure, analysis on program running resource usage within different program running resource usage periods during program running can be performed, so as to obtain usage conditions of a program running resource in different stages during program running, and accurately determine whether currently there is a leak of a program running resource such as a memory leak. In addition, in the embodiments of the present disclosure, program running resource usage only needs to be collected at an interval during program running, and after program running resource usage has been collected for a certain number of times, it is determined whether there is a leak of a program running resource. Therefore, the embodiments of the present disclosure do not greatly affect system performance and are applicable to different target systems, that is, are more general.

Embodiments of the present disclosure further provide a method and an apparatus for predicting a usage condition of a program running resource, so as to solve a problem in the prior art that a future usage condition of a program running resource cannot be predicted during program running.

According to a first aspect, a method for predicting a usage condition of a program running resource is provided, including collecting program running resource usage at least once within each program running resource usage period, where the program running resource usage period is a period that is set according to a periodicity law of program running resource usage; decomposing the collected program running resource usage into different resource components, where the different resource components are constituent parts that are obtained by decomposing the program running resource according to a use law of a program running resource and have different variation laws; for data contained in each resource component, determining a prediction function for the resource component; determining an overall prediction function for the program running resource according to the determined prediction functions for all the resource components; and predicting a usage condition of the program running resource based on the determined overall prediction function.

With reference to the first aspect, in a first possible implementation manner, before the decomposing the collected program running resource usage into different resource components, the method further includes determining that the total number of periods or the total number of times of collecting program running resource usage is not less than a set threshold, and/or a current program running resource occupancy rate is not less than a set threshold, and/or a current CPU occupancy rate is less than a set threshold, and/or current time falls within a set time range.

With reference to the first aspect, in a second possible implementation manner, the decomposing the collected program running resource usage into different resource components includes decomposing the collected program running resource usage into a seasonal component reflecting a periodic variation in program running resource usage and a random component reflecting a random variation in program running resource usage; or decomposing the collected program running resource usage into a trend component reflecting a variation trend of program running resource usage and a random component reflecting a random variation in program running resource usage; or decomposing the collected program running resource usage into a trend component reflecting a variation trend of program running resource usage, a seasonal component reflecting a periodic variation in program running resource usage, and a random component reflecting a random variation in program running resource usage.

With reference to the second possible implementation manner of the first aspect, in a third possible implementation manner, a prediction function for the trend component is a linear function or a nonlinear function that uses prediction time as an independent variable and is obtained by performing linear fitting or nonlinear fitting on data contained in the trend component; a prediction function for the seasonal component is $St=S_i$, where i=t mod T, where t is prediction time, and T is a program running resource usage period; and $S_i$ is an $i^{th}$ data point within a program running resource usage period, to which t corresponds, of the seasonal component; and a prediction function for the random component is a constant, and the constant is an upper quantile of the random component.

With reference to the first aspect, in a fourth possible implementation manner, the determining an overall prediction function for the program running resource according to the determined prediction functions for all the resource components includes adding the determined prediction functions for all the resource components to obtain the overall prediction function for the program running resource.

With reference to the third or fourth possible implementation manner of the first aspect, in a fifth possible implementation manner, the overall prediction function for the program running resource is determined according to the following formula:

$R_t=(a+bt)+S_t+(\mu+k\sigma)$, where in the formula, $R_t$ is the overall prediction function for the program running resource; (a+bt) is the prediction function for the trend component, where a and b are constants; i=t mod T, where T is a program running resource usage period; and (μ+kσ) is the prediction function for the random component, where μ is a mean value of data contained in the random component, σ is a standard deviation of data contained in the random component, k is a constant, and a range of k is (0, 6].

With reference to the first aspect or the first possible implementation manner of the first aspect, in a sixth possible implementation manner, the resource components include a seasonal component reflecting a periodic variation and a random component reflecting a random variation; or the resource components include a trend component reflecting a variation trend of program running resource usage and a random component reflecting a random variation; or the resource components include a trend component reflecting a variation trend of program running resource usage, a seasonal component reflecting a periodic variation, and a random component reflecting a random variation, where a prediction function for the trend component is a linear function or a nonlinear function that uses prediction time as an independent variable and is obtained by performing linear fitting or nonlinear fitting on data contained in the trend component; a prediction function for the seasonal component is $S_i$, where i=t mod T, where t is prediction time, and T is a program running resource usage period; and $S_i$ is an $i^{th}$ piece of program running resource usage within a program running resource usage period corresponding to t; and a prediction function for the random component is an upper confidence limit determined according to a mean value and a standard deviation of data contained in the random component.

With reference to the sixth possible implementation manner of the first aspect, in a seventh possible implementation manner, when the resource components include a trend component, a seasonal component, and a random component, the overall prediction function for the program running resource is determined according to the following formula:

$$R_t = (a+bt) + S_i + (\mu + k\sigma), \text{ where}$$

in the formula, $R_t$ is the overall prediction function for the program running resource; (a+bt) is the prediction function for the trend component, where a and b are constants; and (μ+kσ) is the prediction function for the random component, where μ is the mean value of data contained in the random component, σ is the standard deviation of data contained in the random component, and k is a constant.

With reference to the first aspect or any one of the first to the seventh possible implementation manners of the first aspect, in an eighth possible implementation manner, the predicting a usage condition of the program running resource based on the determined overall prediction function includes, according to the determined overall prediction function, predicting program running resource usage at future set time, and/or predicting when the program running resource will be exhausted, and/or predicting when program running resource usage will reach a set threshold in the future.

With reference to the first aspect or any one of the first to the eighth possible implementation manners of the first aspect, in a ninth possible implementation manner, the number of times of collecting program running resource usage is the same within each program running resource usage period.

According to a second aspect, an apparatus for predicting a usage condition of a program running resource is provided, including a collecting module configured to collect program running resource usage at least once within each program running resource usage period, and transmit the collected program running resource usage to a decomposing module, where the program running resource usage period is a period that is set according to a periodicity law of program running resource usage; the decomposing module configured to receive the program running resource usage collected by the collecting module, decompose the collected program running resource usage into different resource components, and transmit data contained in each resource component to a determining module, where the different resource components are constituent parts that are obtained by decomposing the program running resource according to a use law of a program running resource and have different variation laws; the determining module configured to receive the data contained in each resource component obtained through decomposition by the decomposing module, for data contained in each resource component, determine a prediction function for the resource component, determine an overall prediction function for the program running resource according to the determined prediction functions for all the resource components, and transmit the determined overall prediction function to a predicting module; and the predicting module configured to receive the overall prediction function determined by the determining module, and predict a usage condition of the program running resource based on the overall prediction function.

With reference to the second aspect, in a first possible implementation manner, the determining module is further configured to, before the collecting module decomposes the collected program running resource usage into different resource components, determine that the total number of periods or the total number of times of collecting program running resource usage is not less than a set threshold, and/or a current program running resource occupancy rate is not less than a set threshold, and/or a current CPU occupancy rate is less than a set threshold, and/or current time falls within a set time range.

With reference to the second aspect, in a second possible implementation manner, the decomposing module is configured to decompose the collected program running resource usage into a seasonal component reflecting a periodic variation in program running resource usage and a random component reflecting a random variation in program running resource usage; or decompose the collected program running resource usage into a trend component reflecting a variation trend of program running resource usage and a random component reflecting a random variation in program running resource usage; or decompose the collected program running resource usage into a trend component reflecting a variation trend of program running resource usage, a seasonal component reflecting a periodic variation in program running resource usage, and a random component reflecting a random variation in program running resource usage.

With reference to the second possible implementation manner of the second aspect, in a third possible implementation manner, a prediction function for the trend component is a linear function or a nonlinear function that uses prediction time as an independent variable and is obtained by performing linear fitting or nonlinear fitting on data contained in the trend component; a prediction function for the seasonal component is $St=S_i$, where i=t mod T, where t is prediction time, and T is a program running resource usage period; and $S_i$ is an $i^{th}$ data point within a program running resource usage period, to which t corresponds, of the seasonal component; and a prediction function for the random component is a constant, and the constant is an upper quantile of the random component.

With reference to the second aspect, in a fourth possible implementation manner, when the determining module is configured to determine the overall prediction function for the program running resource according to the determined prediction functions for all the resource components, the determining module is configured to add the determined prediction functions for all the resource components to obtain the overall prediction function for the program running resource.

With reference to the third or the fourth possible implementation manner of the second aspect, in a fifth possible implementation manner, when the determining module is configured to determine the overall prediction function for the program running resource according to the determined prediction functions for all the resource components, the determining module is configured to determine the overall prediction function for the program running resource according to the following formula:

$$R_t=(a+bt)+S_i+(\mu+k\sigma), \text{ where}$$

in the formula, $R_t$ is the overall prediction function for the program running resource; $(a+bt)$ is the prediction function for the trend component, where a and b are constants; $i=t \mod T$, where T is a program running resource usage period; and $(\mu+k\sigma)$ is the prediction function for the random component, where $\mu$ is a mean value of data contained in the random component, $\sigma$ is a standard deviation of data contained in the random component, k is a constant, and a range of k is (0, 6].

With reference to the second aspect or the first possible implementation manner of the second aspect, in a sixth possible implementation manner, the resource components obtained through decomposition by the decomposing module include a seasonal component reflecting a periodic variation and a random component reflecting a random variation; or the resource components obtained through decomposition by the decomposing module include a trend component reflecting a variation trend of program running resource usage and a random component reflecting a random variation; or the resource components obtained through decomposition by the decomposing module include a trend component reflecting a variation trend of program running resource usage, a seasonal component reflecting a periodic variation, and a random component reflecting a random variation, where a prediction function for the trend component is a linear function or a nonlinear function that uses prediction time as an independent variable and is obtained by performing linear fitting or nonlinear fitting on data contained in the trend component; a prediction function for the seasonal component is $S_i$, where $i=t \mod T$, where t is prediction time, and T is a program running resource usage period; and $S_i$ is an $i^{th}$ piece of program running resource usage within a program running resource usage period corresponding to t; and a prediction function for the random component is an upper confidence limit determined according to a mean value and a standard deviation of data contained in the random component.

With reference to the sixth possible implementation manner of the second aspect, in a seventh possible implementation manner, the determining module is configured to, when the resource components obtained through decomposition by the decomposing module include a trend component, a seasonal component, and a random component, determine the overall prediction function for the program running resource according to the following formula:

$$R_t=(a+bt)+S_i+(\mu+k\sigma), \text{ where}$$

in the formula, $R_t$ is the overall prediction function for the program running resource; $(a+bt)$ is the prediction function for the trend component, where a and b are constants; and $(\mu+k\sigma)$ is the prediction function for the random component, where $\mu$ is the mean value of data contained in the random component, $\sigma$ is the standard deviation of data contained in the random component, and k is a constant.

With reference to the second aspect, in an eighth possible implementation manner, the predicting module is configured to, according to the determined overall prediction function, predict program running resource usage at future set time, and/or predict time when the program running resource will be exhausted, and/or predict time when program running resource usage will reach a set threshold in the future.

With reference to the second aspect or any one of the first to the eighth possible implementation manners of the second aspect, in a ninth possible implementation manner, the number of times of collecting program running resource usage is the same within each program running resource usage period.

According to a third aspect, an apparatus for predicting a usage condition of a program running resource is provided, including a processor configured to collect program running resource usage at least once within each program running resource usage period; decompose the collected program running resource usage into different resource components, where the different resource components are constituent parts that are obtained by decomposing the program running resource according to a use law of a program running resource and have different variation laws; and for data contained in each resource component, determine a prediction function for the resource component, determine an overall prediction function for the program running resource according to the determined prediction functions for all the resource components, and predict a usage condition of the program running resource based on the overall prediction function, where the program running resource usage period is a period that is set according to a periodicity law of program running resource usage; and a memory configured to store the program running resource usage that is collected by the processor each time, data contained in the different resource components obtained through decomposition, and the prediction functions.

According to a fourth aspect, a method for predicting a usage condition of a program running resource is provided, including collecting program running resource usage at least once within each program running resource usage period; decomposing the collected program running resource usage into a trend component reflecting a variation trend of program running resource usage, a seasonal component reflecting a periodic variation in program running resource usage, and a random component reflecting a random variation in program running resource usage; for data contained in each resource component, determining a prediction function for the resource component; adding the determined prediction functions for all the resource components to obtain an overall prediction function for a program running resource; and predicting a usage condition of the program running resource based on the determined overall prediction function.

With reference to the fourth aspect, in a first possible implementation manner, a prediction function for the trend component is a linear function or a nonlinear function that uses prediction time as an independent variable and is obtained by performing linear fitting or nonlinear fitting on data contained in the trend component; a prediction function for the seasonal component is $St=S_i$, where $i=t \mod T$, where t is prediction time, and T is a program running resource usage period; and $S_i$ is an $i^{th}$ data point within a program running resource usage period, to which t corresponds, of the seasonal component; and a prediction function for the random component is a constant, and the constant is an upper quantile of the random component.

With reference to the fourth aspect or the first possible implementation manner of the fourth aspect, in a second possible implementation manner, the overall prediction function for the program running resource is determined according to the following formula:

$$R_t = (a+bt) + S_i + (\mu + k\sigma), \text{ where}$$

in the formula, $R_t$ is the overall prediction function for the program running resource; (a+bt) is the prediction function for the trend component, where a and b are constants; i=t mod T, where T is a program running resource usage period; and ($\mu+k\sigma$) is the prediction function for the random component, where $\mu$ is a mean value of data contained in the random component, $\sigma$ is a standard deviation of data contained in the random component, k is a constant, and a range of k is (0, 6].

With reference to the fourth aspect or either of the first and the second possible implementation manners of the fourth aspect, in a third possible implementation manner, the predicting a usage condition of the program running resource based on the determined overall prediction function includes, according to the determined overall prediction function, predicting program running resource usage at future set time, and/or predicting when the program running resource will be exhausted, and/or predicting when program running resource usage will reach a set threshold in the future.

With reference to the fourth aspect or any one of the first to the third possible implementation manners of the fourth aspect, in a fourth possible implementation manner, the number of times of collecting program running resource usage is the same within each program running resource usage period.

With reference to the fourth aspect or any one of the first to the fourth possible implementation manners of the fourth aspect, in a fifth possible implementation manner, the program running resource usage period is a period that is set according to a periodicity law of program running resource usage.

According to a fifth aspect, an apparatus for predicting a usage condition of a program running resource is provided, including a collecting module configured to collect program running resource usage at least once within each program running resource usage period; a decomposing module configured to decompose the collected program running resource usage into a trend component reflecting a variation trend of program running resource usage, a seasonal component reflecting a periodic variation in program running resource usage, and a random component reflecting a random variation in program running resource usage; a determining module configured to, for data contained in each resource component, determine a prediction function for the resource component, and add the determined prediction functions for all the resource components to obtain an overall prediction function for a program running resource; and a predicting module configured to predict a usage condition of the program running resource based on the overall prediction function.

With reference to the fifth aspect, in a first possible implementation manner, a prediction function for the trend component is a linear function or a nonlinear function that uses prediction time as an independent variable and is obtained by performing linear fitting or nonlinear fitting on data contained in the trend component; a prediction function for the seasonal component is $St=S_i$, where i=t mod T, where t is prediction time, and T is a program running resource usage period; and $S_i$ is an $i^{th}$ data point within a program running resource usage period, to which t corresponds, of the seasonal component; and a prediction function for the random component is a constant, and the constant is an upper quantile of the random component.

With reference to the fifth aspect or the first possible implementation manner of the fifth aspect, in a second possible implementation manner, the determining module is configured to determine the overall prediction function for the program running resource according to the following formula:

$$R_t = (a+bt) + S_i + (\mu + k\sigma), \text{ where}$$

in the formula, $R_t$ is the overall prediction function for the program running resource; (a+bt) is the prediction function for the trend component, where a and b are constants; i=t mod T, where T is a program running resource usage period; and ($\mu+k\sigma$) is the prediction function for the random component, where $\mu$ is a mean value of data contained in the random component, $\sigma$ is a standard deviation of data contained in the random component, k is a constant, and a range of k is (0, 6].

With reference to the fifth aspect or either of the first and the second possible implementation manners of the fifth aspect, in a third possible implementation manner, the predicting module is configured to, according to the determined overall prediction function, predict program running resource usage at future set time, and/or predict time when the program running resource will be exhausted, and/or predict time when program running resource usage will reach a set threshold in the future.

With reference to the fifth aspect or any one of the first to the third possible implementation manners of the fifth aspect, in a fourth possible implementation manner, the number of times of collecting program running resource usage is the same within each program running resource usage period.

With reference to the fifth aspect or any one of the first to the fourth possible implementation manners of the fifth aspect, in a fifth possible implementation manner, the program running resource usage period is a period that is set according to a periodicity law of program running resource usage.

According to the method for predicting a usage condition of a program running resource provided in the first aspect or the fourth aspect and the apparatus for predicting a usage condition of a program running resource provided in the second aspect or the third aspect or the fifth aspect, in the embodiments of the present disclosure, according to a use law of a program running resource, program running resource usage is decomposed into constituent parts having different change rules, and fitting and estimation are separately performed on different constituent parts to obtain prediction functions that accurately reflect change rules of program running resource usage of different constituent parts, so as to further obtain a prediction function that reflects an overall change rule of program running resource usage; therefore, by using the embodiments of the present disclosure, a future usage condition of a program running resource can be accurately predicted, thereby overcoming a disadvantage in the prior art that a usage condition of a resource cannot be predicted during program running.

DESCRIPTION OF EMBODIMENTS

Figure 1:
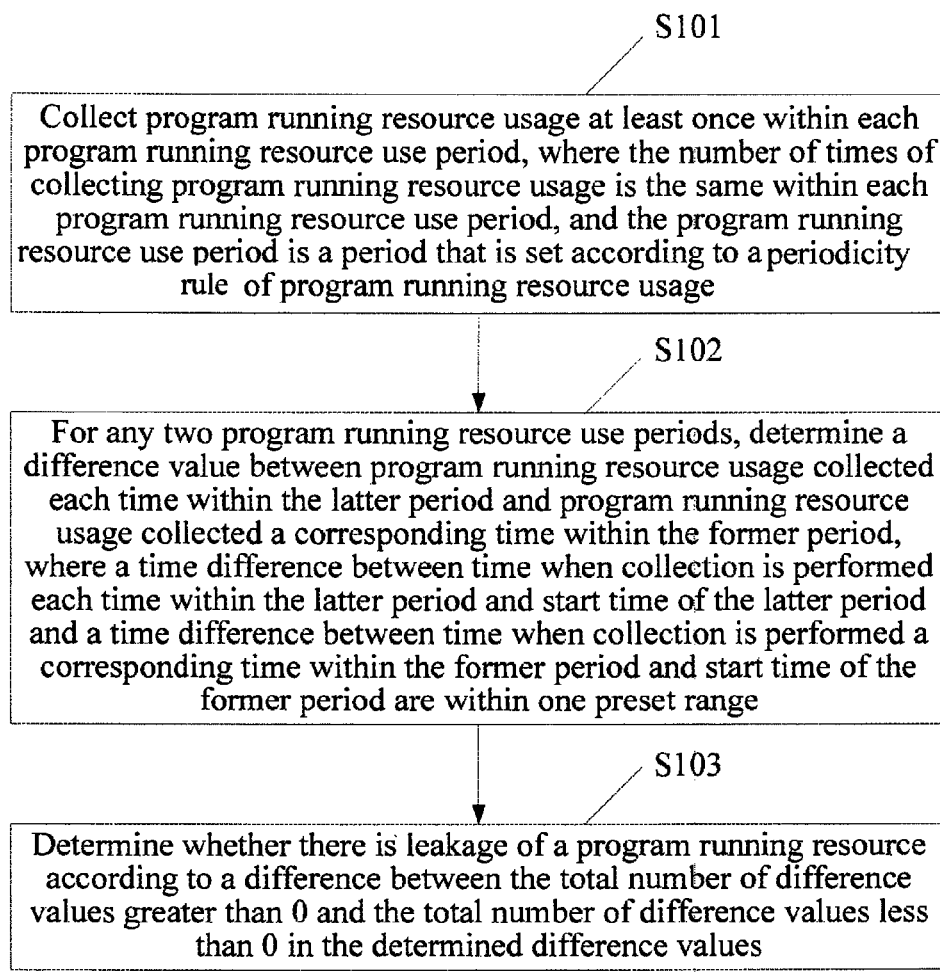
FIG. 1 is a flowchart of a method for determining a leak of a program running resource provided in an embodiment of the present disclosure.

In embodiments of the present disclosure, program running resource usage is collected at least once within each program running resource usage period, for any two program running resource usage periods, a difference value between program running resource usage collected each time within the latter period and program running resource usage collected for a corresponding sequence number within the former period is determined, and it is determined whether there is a leak of a program running resource according to a difference between the total number of difference values greater than 0 and the total number of difference values less than 0 among the determined difference values. Using the embodiments of the present disclosure, analysis on program running resource usage within different program running resource usage periods during program running can be performed, so as to obtain usage conditions of a program running resource in different stages during program running, and accurately determine whether currently there is a leak of a program running resource such as a memory leak. In addition, in the embodiments of the present disclosure, program running resource usage only needs to be collected at an interval during program running, and after program running resource usage has been collected for a certain number of times, it is determined whether there is a leak of a program running resource. Therefore, the embodiments of the present disclosure do not greatly affect system performance and are applicable to different application programs, that is, are more general.

In embodiments of the present disclosure, program running resource usage is collected at least once within each program running resource usage period, the collected program running resource usage is decomposed into different resource components, for data contained in each resource component, a prediction function for the resource component is determined, an overall prediction function for a program running resource is determined according to the determined prediction functions for all the resource components, and finally a usage condition of the program running resource is predicted based on the determined overall prediction function. In the embodiments of the present disclosure, according to a use law of a program running resource, program running resource usage is decomposed into constituent parts having different change rules, and fitting and estimation are separately performed on different constituent parts to obtain prediction functions that accurately reflect change rules of program running resource usage of different constituent parts, so as to further obtain a prediction function that reflects an overall change rule of program running resource usage; therefore, by using the embodiments of the present disclosure, a future usage condition of a program running resource can be accurately predicted, thereby overcoming a disadvantage in the prior art that a usage condition of a resource cannot be predicted during program running.

An embodiment of the present disclosure provides a method for determining a leak of a program running resource, including collecting program running resource usage at least once within each program running resource usage period, where the number of times of collecting program running resource usage is the same within each program running resource usage period, and the program running resource usage period is a period that is set according to a periodicity law of program running resource usage; for every two program running resource usage periods, determining a difference value between program running resource usage collected each time within the latter period and program running resource usage collected for a corresponding sequence number within the former period, where a time difference between time when collection is performed each time within the latter period and start time of the latter period and a time difference between time when collection is performed for a corresponding sequence number within the former period and start time of the former period fall within a preset range, and the preset range is a duration range smaller than a minimum time interval among time intervals between every two adjacent times of collection within the former period, or, the preset range is a duration range smaller than a minimum time interval among time intervals between every two adjacent times of collection within the latter period; and if a difference between the total number of difference values greater than 0 and the total number of difference values less than 0 among the determined difference values is greater than a set threshold, determining that there is a leak of a program running resource, where a range of the threshold is greater than or equal to 0, and is less than or equal to 70% of a sum of the total number of difference values greater than 0 and the total number of difference values less than 0 among the determined difference values.

An embodiment of the present disclosure further provides a method for determining a leak of a program running resource, including collecting program running resource usage at least once within each program running resource usage period, where the number of times of collecting program running resource usage is the same within each program running resource usage period, and the program running resource usage period is a period that is set according to a periodicity law of program running resource usage; for every two program running resource usage periods, determining a difference value between program running resource usage collected each time within the latter period and program running resource usage collected for a corresponding sequence number within the former period, where a time difference between time when collection is performed each time within the latter period and start time of the latter period and a time difference between time when collection is performed for a corresponding sequence number within the former period and start time of the former period fall within a preset range, and the preset range is a duration range smaller than a minimum time interval among time intervals between every two adjacent times of collection within the former period, or, the preset range is a duration range smaller than a minimum time interval among time intervals between every two adjacent times of collection within the latter period; determining a statistic Z of a difference between the total number of difference values greater than 0 and the total number of difference values less than 0; and if Z is greater than a set threshold, determining that there is a leak of a program running resource, where the statistic Z of the difference S' between the total number of difference values greater than 0 and the total number of difference values less than 0 is determined according to the following formula:

if $$n \geq 10, Z = \frac{S'}{[VAR(S')]^{1/2}},$$

where n is the number of program running resource usage periods;

otherwise, $$Z = \begin{cases} \frac{(S'-1)}{[VAR(S')]^{1/2}}, & S' > 0 \\ 0, & S' = 0 \\ \frac{(S'+1)}{[VAR(S')]^{1/2}}, & S' < 0 \end{cases}$$

where $$S_i = \sum_{k=1}^{n-1} \sum_{l=k+1}^{n} \text{sgn}(R_{il} - R_{ik}),$$

$$S' = \sum_{i=1}^{m} S_i,$$

$$VAR(S') = \sum_{i=1}^{m} VAR(S_i),$$

$R_{ik}$ is program running resource usage collected for an $i^{th}$ time within a $k^{th}$ program running resource usage period, $R_{il}$ is program running resource usage collected for an $i^{th}$ time within a $1^{st}$ program running resource usage period, and m is the number of times of collecting program running resource usage within one program running resource usage period; and the threshold is a quantile value determined according to a probability distribution of the statistic Z.

An embodiment of the present disclosure further provides an apparatus for determining a leak of a program running resource, including a collecting module configured to collect program running resource usage at least once within each program running resource usage period, where the number of times of collecting program running resource usage is the same within each program running resource usage period, and the program running resource usage period is a period that is set according to a periodicity law of program running resource usage; a determining module configured to, for every two program running resource usage periods, determine a difference value between program running resource usage collected each time within the latter period and program running resource usage collected for a corresponding sequence number within the former period, where a time difference between time when collection is performed each time within the latter period and start time of the latter period and a time difference between time when collection is performed for a corresponding sequence number within the former period and start time of the former period fall within a preset range, and the preset range is a duration range smaller than a minimum time interval among time intervals between every two adjacent times of collection within the former period, or, the preset range is a duration range smaller than a minimum time interval among time intervals between every two adjacent times of collection within the latter period; and a judging module configured to, when a difference between the total number of difference values greater than 0 and the total number of difference values less than 0 among the determined difference values is greater than a set threshold, determine that there is a leak of a program running resource, where a range of the threshold is greater than or equal to 0, and is less than or equal to 70% of a sum of the total number of difference values greater than 0 and the total number of difference values less than 0 among the determined difference values.

An embodiment of the present disclosure further provides an apparatus for determining a leak of a program running resource, including a collecting module configured to collect program running resource usage at least once within each program running resource usage period, where the number of times of collecting program running resource usage is the same within each program running resource usage period, and the program running resource usage period is a period that is set according to a periodicity law of program running resource usage; a determining module configured to, for every two program running resource usage periods, determine a difference value between program running resource usage collected each time within the latter period and program running resource usage collected for a corresponding sequence number within the former period, where a time difference between time when collection is performed each time within the latter period and start time of the latter period and a time difference between time when collection is performed for a corresponding sequence number within the former period and start time of the former period fall within a preset range, and the preset range is a duration range smaller than a minimum time interval among time intervals between every two adjacent times of collection within the former period, or, the preset range is a duration range smaller than a minimum time interval among time intervals between every two adjacent times of collection within the latter period; and a judging module configured to determine a statistic Z of a difference between the total number of difference values greater than 0 and the total number of difference values less than 0, and if Z is greater than a set threshold, determine that there is a leak of a program running resource, where the judging module is configured to determine the statistic Z of the difference S' between the total number of difference values greater than 0 and the total number of difference values less than 0 according to the following formula:

if $$n \geq 10, Z = \frac{S'}{[VAR(S')]^{1/2}},$$

where n is the number of program running resource usage periods;

otherwise, $$Z = \begin{cases} \frac{(S'-1)}{[VAR(S')]^{1/2}}, & S' > 0 \\ 0, & S' = 0 \\ \frac{(S'+1)}{[VAR(S')]^{1/2}}, & S' < 0 \end{cases}$$

where $$S_i = \sum_{k=1}^{n-1} \sum_{l=k+1}^{n} \text{sgn}(R_{il} - R_{ik}),$$

$$S' = \sum_{i=1}^{m} S_i,$$

$$VAR(S') = \sum_{i=1}^{m} VAR(S_i),$$

$R_{ik}$ is program running resource usage collected for an $i^{th}$ time within a $k^{th}$ program running resource usage period, $R_{il}$ is program running resource usage collected for an $i^{th}$ time within a $1^{st}$ program running resource usage period, and m is the number of times of collecting program running resource usage within one program running resource usage period; and the threshold is a quantile value determined according to a probability distribution of the statistic Z.

The embodiments of the present disclosure are further described below in detail with reference to the accompanying drawings of the specification.

As shown in FIG. 1, FIG. 1 is a flowchart of a method for determining a leak of a program running resource provided in an embodiment of the present disclosure. The method includes the following steps.

S101. Collect program running resource usage at least once within each program running resource usage period, where the number of times of collecting program running resource usage is the same within each program running resource usage period, and the program running resource usage period is a period that is set according to a periodicity law of program running resource usage.

S102. For any two program running resource usage periods, determine a difference value between program running resource usage collected each time within the latter period and program running resource usage collected for a corresponding sequence number within the former period, where a time difference between time when collection is performed each time within the latter period and start time of the latter period and a time difference between time when collection is performed for a corresponding sequence number within the former period and start time of the former period fall within a preset range.

S103. Determine whether there is a leak of a program running resource according to a difference between the total number of difference values greater than 0 and the total number of difference values less than 0 among the determined difference values.

The program running resource in this embodiment of the present disclosure may be a memory resource or may also be a software resource such as a file handle, a semaphore, a database connection pool, or a thread pool that is needed for program running. In this embodiment of the present disclosure, a target object for which whether there is a leak of a program running resource is determined may be of a different level, for example, may be a host, a virtual machine, a process, a process submodule, a memory partition of a process, or the like.

A basic concept of this embodiment of the present disclosure is as follows. According to a periodic characteristic of program running resource usage, program running resource usage is collected within each program running resource usage period for one or more times. A difference value between program running resource usage collected each time within a latter period and program running resource usage collected for a corresponding number of times within a former period is determined. Here, for one difference value, if the difference value is greater than 0, it indicates that in two pieces of program running resource usage corresponding to the difference value, the program running resource usage in the latter period rises as compared with the program running resource usage in the former period; if the difference value is less than 0, it indicates that in two pieces of program running resource usage corresponding to the difference value, the program running resource usage in the latter period drops as compared with the program running resource usage in the former period; if the difference value is equal to 0, it indicates that in two pieces of program running resource usage corresponding to the difference value, the program running resource usage in the latter period is equal to the program running resource usage in the former period. Therefore, in the determined difference values corresponding to all the periods, the total number of difference values greater than 0 indicates the number of times that program running resource usage rises with time in the total number of times of collecting program running resource usage, and the total number of difference values less than 0 indicates the number of times that program running resource usage drops with time in the total number of times of collecting program running resource usage. Therefore, a difference value between the total number of difference values greater than 0 and the total number of difference values less than 0 can indicate an overall condition of a rise or a drop of program running resource usage. Here, a time difference between time when collection is performed each time within the latter period and start time of the latter period and a time difference between time when collection is performed for a corresponding sequence number within the former period and start time of the former period fall within a preset range. In practical implementation, to make a determining result more accurate, a time difference between time when collection is performed each time within the latter period and start time of the latter period may be made the same as a time difference between time when collection is performed for a corresponding sequence number within the former period and start time of the former period.

Further, in this embodiment of the present disclosure, the preset range is a duration range smaller than a minimum time interval among time intervals between every two adjacent times of collection within the former period, or, the preset range is a duration range smaller than a minimum time interval among time intervals between every two adjacent times of collection within the latter period.

Preferably, program running resource usage may be collected at a same set frequency within each program running resource usage period.

Preferably, before the determining a difference value between program running resource usage collected each time within the latter period and program running resource usage collected for a corresponding sequence number within the former period, the method further includes determining that the total number of periods or the total number of times of collecting program running resource usage is not less than a set threshold, and/or a current program running resource occupancy rate is not less than a set threshold, and/or a current CPU occupancy rate is less than a set threshold, and/or current time falls within a set time range.

In an implementation process, one or more conditions to start determining whether there is a leak of a program running resource may be set, for example, a condition that the total number of periods or the total number of times that program running resource usage has been collected currently reaches or exceeds a set threshold, a condition that a current program running resource occupancy rate reaches or exceeds a set threshold, a condition that a current CPU occupancy rate is less than a set threshold, and a condition that current time falls within a set time range.

In an implementation process, it may be set to start determining whether there is a leak of a program running resource when any one or more of the foregoing determining conditions are met. Here, a determining result becomes more accurate when the total number of periods or the total number of times of collecting program running resource usage is greater, and therefore a threshold may be set; when the total number of periods or the total number of times of collecting program running resource usage reaches or exceeds the set threshold, determining whether there is a leak of a program running resource is started. A current CPU occupancy rate may further be considered. If a current CPU occupancy rate is high, it indicates that currently a system is busy; in order not to affect system performance, it may be set that determining whether there is a leak of a program running resource is started only when the CPU occupancy rate is less than a set threshold. A time range of starting determining may further be set, and it is set that determining whether there is a leak of a program running resource is performed during idle time of the system. In addition, a first threshold may further be set for a program running resource occupancy rate, where when the program running resource occupancy rate reaches the first threshold, it indicates a relatively high risk of program running resource exhaustion, and it may be set when the program running resource occupancy rate reaches the first threshold, regardless of whether other determining conditions are met, determining whether there is a leak of a program running resource is started. In addition, a second threshold may further be set for the program running resource occupancy rate, where when the program running resource occupancy rate does not reach the second threshold, it indicates that there are relatively abundant program running resources, and it may be set that when the program running resource occupancy rate does not reach the second threshold, regardless of whether other determining conditions are met, determining whether there is a leak of a program running resource is not started.

In an implementation process, it may be determined whether there is a leak of a program running resource according to a difference between the total number of difference values greater than 0 and the total number of difference values less than 0 among the determined difference values in multiple manners, and in this embodiment of the present disclosure, two implementation manners are provided as follows.

Manner 1. Determine whether there is a leak of a program running resource according to whether a difference between the total number of difference values greater than 0 and the total number of difference values less than 0 is greater than a set threshold.

Determining whether there is a leak of a program running resource according to a difference between the total number of difference values greater than 0 and the total number of difference values less than 0 includes, if the difference between the total number of difference values greater than 0 and the total number of difference values less than 0 is greater than the set threshold, determining that there is a leak of a program running resource.

In the implementation manner, a range of the threshold is greater than or equal to 0, and is less than or equal to 70% of a sum of the total number of difference values greater than 0 and the total number of difference values less than 0 among the determined difference values.

Here, because a difference value between the total number of difference values greater than 0 and the total number of difference values less than 0 may indicate an overall condition of a rise or a drop of program running resource usage, it may be directly determined whether there is a leak of a program running resource according to whether a difference between the number of difference values greater than 0 and the number of difference values less than 0 reaches or exceeds a set threshold. For example, in the total number of difference values, 90% of the difference values are greater than 0, and only 10% of the difference values are less than 0; in this case, it may be considered that currently there is a leak of a program running resource.

For determining whether there is a leak of a program running resource, the manner is relatively visual, also has a relatively simple implementation process, and also has very little impact on system performance.

Manner 2. Determine whether there is a leak of a program running resource according to whether a statistic Z of a difference between the total number of difference values greater than 0 and the total number of difference values less than 0 is greater than a set threshold.

Determining whether there is a leak of a program running resource according to a difference between the total number of difference values greater than 0 and the total number of difference values less than 0 includes determining a statistic Z of a difference between the total number of difference values greater than 0 and the total number of difference values less than 0; and if Z is greater than the set threshold, determining that there is a leak of a program running resource.

In this implementation manner, the threshold is a quantile value determined according to a probability distribution of the statistic Z.

A basic concept of this implementation manner is to use a probability statistics manner, in which, instead of directly comparing a set threshold with a difference value S between the number of difference values greater than 0 and the number of difference values less than 0, a statistic Z corresponding to S' is determined, where the statistic Z is a quantity that may represent the value of S' and meets a probability distribution. In this implementation manner, it is determined whether there is a leak of a program running resource according to whether the statistic Z is greater than the set threshold.

Preferably, the statistic Z of the difference S' between the total number of difference values greater than 0 and the total number of difference values less than 0 is determined according to the following formula:

if $$n \geq 10, Z = \frac{S'}{[VAR(S')]^{1/2}},$$

where n is the number of program running resource usage periods;

otherwise, $$Z = \begin{cases} \frac{(S'-1)}{[VAR(S')]^{1/2}}, & S' > 0 \\ 0, & S' = 0 \\ \frac{(S'+1)}{[VAR(S')]^{1/2}}, & S' < 0 \end{cases}$$

where $$S_i = \sum_{k=1}^{n-1} \sum_{l=k+1}^{n} \operatorname{sgn}(R_{il} - R_{ik}),$$

$$S' = \sum_{i=1}^{m} S_i,$$

$$VAR(S') = \sum_{i=1}^{m} VAR(S_i),$$

$R_{ik}$ is program running resource usage collected for an $i^{th}$ time within a $k^{th}$ program running resource usage period, $R_{il}$ is program running resource usage collected for an $i^{th}$ time within a $1^{st}$ program running resource usage period, and m is the number of times of collecting program running resource usage within one program running resource usage period.

Here, the statistic Z corresponding to S' follows a standard normal distribution, VAR( ) is a variance function, and sgn( ) is a sign function. When a difference value between program running resource usage collected one time within the latter period and program running resource usage collected for a corresponding sequence number within the former period is greater than 0, a value of the sign function is 1. When a difference value between program running resource usage collected one time within the latter period and program running resource usage collected for a corresponding sequence number within the former period is less than 0, a value of the sign function is −1. When a difference value between program running resource usage collected one time within the latter period and program running resource usage collected for a corresponding sequence number within the former period is equal to 0, a value of the sign function is 0.

Here, a set threshold $Z_\alpha$ of the statistic Z is an upper quantile in the standard normal distribution, where a probability that the statistic Z is greater than the threshold $Z_\alpha$ is $\alpha$, and a value of $\alpha$ may be set according to an actual requirement, for example, 5%, 1% or the like. If it is determined that Z is greater than $Z_\alpha$, it is determined that there is a leak of a program running resource, and in contrast, if Z is not greater than $Z_\alpha$, it is considered that there is no a leak of a program running resource.

A relatively typical implementation manner for determining a leak of a program running resource is given below.

Figure 2:
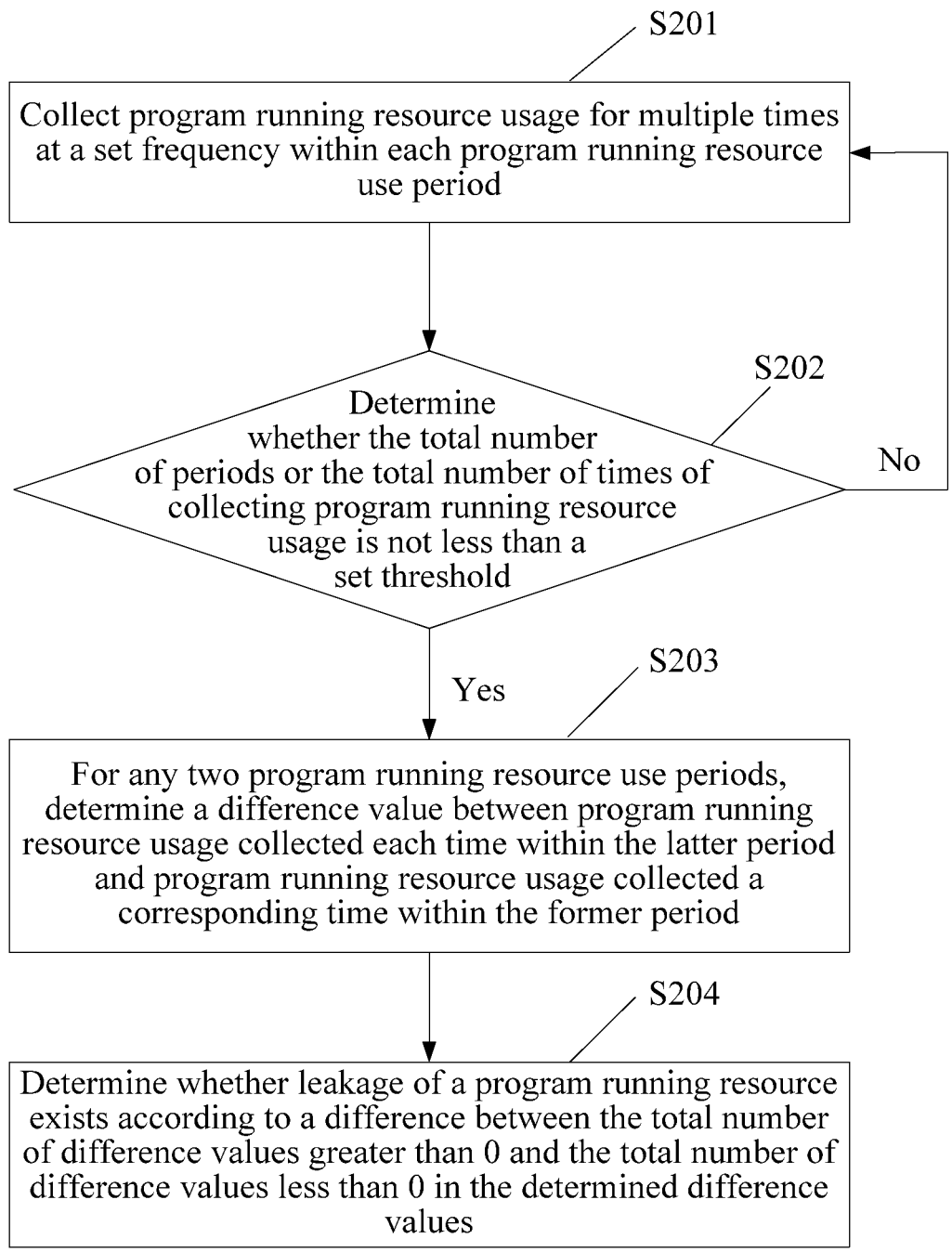
FIG. 2 is a flowchart of a method for determining a leak of a program running resource provided in an exemplary embodiment of the present disclosure.

As shown in FIG. 2, FIG. 2 is a flowchart of a method for determining a leak of a program running resource provided in an exemplary embodiment of the present disclosure. The method includes the following steps.

S201. Collect program running resource usage for multiple times at a set frequency within each program running resource usage period.

S202. Determine whether the total number of periods or the total number of times of collecting program running resource usage is not less than a set threshold, and if yes, perform step S203; otherwise, return to step S201.

In an implementation process, other determining conditions may further be set, for example, whether a current program running resource occupancy rate is not less than a set threshold, whether a current CPU occupancy rate is less than a set threshold, and whether current time falls within a set time range.

S203. For any two program running resource usage periods, determine a difference value between program running resource usage collected each time within the latter period and program running resource usage collected for a corresponding sequence number within the former period.

S204. Determine whether there is a leak of a program running resource according to a difference between the total number of difference values greater than 0 and the total number of difference values less than 0 among the determined difference values.

In an implementation process, the foregoing Manner 1 or Manner 2 may be used to determine whether there is a leak of a program running resource according to a difference between the total number of difference values greater than 0 and the total number of difference values less than 0, which is no longer elaborated herein.

Based on the same concept, an embodiment of the present disclosure further provides an apparatus for determining a leak of a program running resource corresponding to the method for determining a leak of a program running resource. Because the principle of solving the problem by the apparatus is similar to that in the method for determining a leak of a program running resource according to the embodiment of the present disclosure, for the implementation of the apparatus, refer to the implementation of the method, and repeated parts are no longer elaborated.

Figure 3:
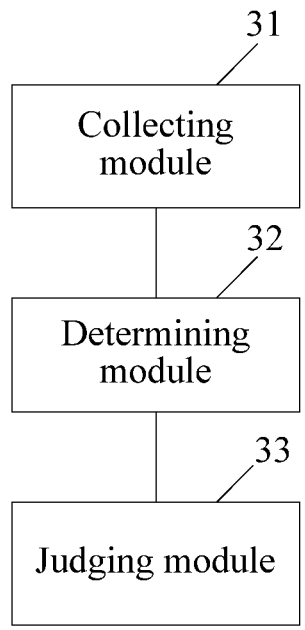
FIG. 3 is a schematic structural diagram of an apparatus for determining a leak of a program running resource provided in an embodiment of the present disclosure.

As shown in FIG. 3, FIG. 3 is a schematic structural diagram of an apparatus for determining a leak of a program running resource provided in an embodiment of the present disclosure. The apparatus includes a collecting module 31 configured to collect program running resource usage at least once within each program running resource usage period, and transmit the collected program running resource usage to a determining module, where the number of times of collecting program running resource usage is the same within each program running resource usage period, and the program running resource usage period is a period that is set according to a periodicity law of program running resource usage; the determining module 32 configured to receive the program running resource usage that is collected by the collecting module 31 each time, and for any two program running resource usage periods, determine a difference value between program running resource usage collected each time within the latter period and program running resource usage collected for a corresponding sequence number within the former period, and transmit the determined difference values to a judging module 33, where a time difference between time when collection is performed each time within the latter period and start time of the latter period and a time difference between time when collection is performed for a corresponding sequence number within the former period and start time of the former period fall within a preset range; and the judging module 33 configured to receive the difference values determined by the determining module 32, and determine whether there is a leak of a program running resource according to a difference between the total number of difference values greater than 0 and the total number of difference values less than 0 among the determined difference values.

Further, in this embodiment, the preset range is a duration range smaller than a minimum time interval among time intervals between every two adjacent times of collection within the former period, or, the preset range is a duration range smaller than a minimum time interval among time intervals between every two adjacent times of collection within the latter period.

Preferably, the determining module 32 is further configured to, before the difference value between the program running resource usage collected each time within the latter period and the program running resource usage collected the corresponding time within the former period is determined, determine that the total number of periods or the total number of times of collecting program running resource usage is not less than a set threshold, and/or a current program running resource occupancy rate is not less than a set threshold, and/or a current CPU occupancy rate is less than a set threshold, and/or current time falls within a set time range.

Preferably, the judging module 33 is configured to, if the difference between the total number of difference values greater than 0 and the total number of difference values less than 0 is greater than a set threshold, determine that there is a leak of a program running resource. A range of the threshold is greater than or equal to 0, and is less than or equal to 70% of a sum of the total number of difference values greater than 0 and the total number of difference values less than 0 among the determined difference values.

Preferably, the judging module 33 is configured to determine a statistic Z of the difference between the total number of difference values greater than 0 and the total number of difference values less than 0; and if Z is greater than the set threshold, determine that there is a leak of a program running resource, where the threshold is a quantile value determined according to a probability distribution of the statistic Z.

Preferably, the judging module 33 is configured to determine the statistic Z of the difference S' between the total number of difference values greater than 0 and the total number of difference values less than 0 according to the following formula:

if $$n \geq 10, Z = \frac{S'}{[VAR(S')]^{1/2}},$$

where n is the number of program running resource usage periods;

otherwise, $$Z = \begin{cases} \frac{(S'-1)}{[VAR(S')]^{1/2}}, & S' > 0 \\ 0, & S' = 0 \\ \frac{(S'+1)}{[VAR(S')]^{1/2}}, & S' < 0 \end{cases},$$

where $$S_i = \sum_{k=1}^{n-1} \sum_{l=k+1}^{n} \text{sgn}(R_{il} - R_{ik}),$$

$$S' = \sum_{i=1}^{m} S_i,$$

$$VAR(S') = \sum_{i=1}^{m} VAR(S_i),$$

$R_{ik}$ is program running resource usage collected for an $i^{th}$ time within a $k^{th}$ program running resource usage period, $R_{il}$ is program running resource usage collected for an $i^{th}$ time within a 1st program running resource usage period, and m is the number of times of collecting program running resource usage within one program running resource usage period.

Figure 4:
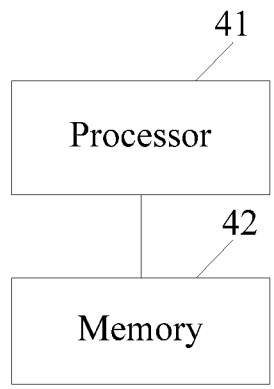
FIG. 4 is a structural diagram of an apparatus for determining a leak of a program running resource provided in an embodiment of the present disclosure.

As shown in FIG. 4, FIG. 4 is a structural diagram of an apparatus for determining a leak of a program running resource provided in an embodiment of the present disclosure. The apparatus includes a processor 41 configured to collect program running resource usage at least once within each program running resource usage period, where the number of times of collecting program running resource usage is the same within each program running resource usage period, and the program running resource usage period is a period that is set according to a periodicity law of program running resource usage; for any two program running resource usage periods, determine a difference value between program running resource usage collected each time within the latter period and program running resource usage collected for a corresponding sequence number within the former period, where a time difference between time when collection is performed each time within the latter period and start time of the latter period and a time difference between time when collection is performed for a corresponding sequence number within the former period and start time of the former period fall within a preset range; and determine whether there is a leak of a program running resource according to a difference between the total number of difference values greater than 0 and the total number of difference values less than 0 among the determined difference values; and a memory 42 configured to store the program running resource usage that is collected by the processor each time and the determined difference value between the program running resource usage collected each time within the latter period and the program running resource usage collected for a corresponding sequence number within the former period.

The preset range is a duration range smaller than a minimum time interval among time intervals between every two adjacent times of collection within the former period, or, the preset range is a duration range smaller than a minimum time interval among time intervals between every two adjacent times of collection within the latter period.

Preferably, the processor 41 is further configured to, before the difference value between the program running resource usage collected each time within the latter period and the program running resource usage collected the corresponding time within the former period is determined, determine that the total number of periods or the total number of times of collecting program running resource usage is not less than a set threshold, and/or a current program running resource occupancy rate is not less than a set threshold, and/or a current CPU occupancy rate is less than a set threshold, and/or current time falls within a set time range.

Preferably, the processor 41 is configured to, if the difference between the total number of difference values greater than 0 and the total number of difference values less than 0 is greater than a set threshold, determine that there is a leak of a program running resource. A range of the threshold is greater than or equal to 0, and is less than or equal to 70% of a sum of the total number of difference values greater than 0 and the total number of difference values less than 0 among the determined difference values.

Preferably, the processor 41 is configured to determine a statistic Z of the difference between the total number of difference values greater than 0 and the total number of difference values less than 0, and if Z is greater than a set threshold, determine that there is a leak of a program running resource. The threshold is a quantile value determined according to a probability distribution of the statistic Z.

Preferably, the processor 41 is configured to determine the statistic Z of the difference S' between the total number of difference values greater than 0 and the total number of difference values less than 0 according to the following formula:

if $$n \geq 10, Z = \frac{S'}{[VAR(S')]^{1/2}},$$

where n is the number of program running resource usage periods;

otherwise, $$Z = \begin{cases} \frac{(S'-1)}{[VAR(S')]^{1/2}}, & S' > 0 \\ 0, & S' = 0, \\ \frac{(S'+1)}{[VAR(S')]^{1/2}}, & S' < 0 \end{cases}$$

where $$S_i = \sum_{k=1}^{n-1} \sum_{l=k+1}^{n} \text{sgn}(R_{il} - R_{ik}),$$

$$S' = \sum_{i=1}^{m} S_i,$$

$$VAR(S') = \sum_{i=1}^{m} VAR(S_i),$$

$R_{ik}$ is program running resource usage collected for an $i^{th}$ time within a $k^{th}$ program running resource usage period, $R_{il}$ is program running resource usage collected for an $i^{th}$ time within a 1st program running resource usage period, and m is the number of times of collecting program running resource usage within one program running resource usage period.

The present disclosure provides a method for predicting a usage condition of a program running resource, including collecting program running resource usage at least once within each program running resource usage period; decomposing the collected program running resource usage into a trend component reflecting a variation trend of program running resource usage, a seasonal component reflecting a periodic variation in program running resource usage, and a random component reflecting a random variation in program running resource usage; for data contained in each resource component, determining a prediction function for the resource component; adding the determined prediction functions for all the resource components to obtain an overall prediction function for a program running resource; and predicting a usage condition of the program running resource based on the determined overall prediction function.

Further, in this embodiment, a prediction function for the trend component is a linear function or a nonlinear function that uses prediction time as an independent variable and is obtained by performing linear fitting or nonlinear fitting on data contained in the trend component; a prediction function for the seasonal component is $St=S_i$, where i=t mod T, where t is prediction time, and T is a program running resource usage period; and $S_i$ is an $i^{th}$ data point within a program running resource usage period, to which t corresponds, of the seasonal component; and a prediction function for the random component is a constant, and the constant is an upper quantile of the random component.

Further, in this embodiment, the overall prediction function for the program running resource may be determined according to the following formula:

$$R_t = (a+bt) + S_t + (\mu+k\sigma), \text{ where}$$

in the formula, $R_t$ is the overall prediction function for the program running resource; (a+bt) is the prediction function for the trend component, where a and b are constants; i=t mod T, where T is a program running resource usage period; and (μ+kσ) is the prediction function for the random component, where μ is a mean value of data contained in the random component, σ is a standard deviation of data contained in the random component, k is a constant, and a range of k is (0, 6].

Further, in this embodiment, the predicting a usage condition of the program running resource based on the determined overall prediction function may include, according to the determined overall prediction function, predicting program running resource usage at future set time, and/or predicting when the program running resource will be exhausted, and/or predicting when program running resource usage will reach a set threshold in the future.

Further, in this embodiment, the number of times of collecting program running resource usage is the same within each program running resource usage period.

Further, in this embodiment, the program running resource usage period is a period that is set according to a periodicity law of program running resource usage.

An embodiment of the present disclosure further provides an apparatus for predicting a usage condition of a program running resource, including a collecting module configured to collect program running resource usage at least once within each program running resource usage period; a decomposing module configured to decompose the collected program running resource usage into a trend component reflecting a variation trend of program running resource usage, a seasonal component reflecting a periodic variation in program running resource usage, and a random component reflecting a random variation in program running resource usage; a determining module configured to, for data contained in each resource component, determine a prediction function for the resource component, and add the determined prediction functions for all the resource components to obtain an overall prediction function for a program running resource; and a predicting module configured to predict a usage condition of the program running resource based on the overall prediction function.

Further, in this embodiment, a prediction function for the trend component may be a linear function or a nonlinear function that uses prediction time as an independent variable and is obtained by performing linear fitting or nonlinear fitting on data contained in the trend component; a prediction function for the seasonal component may be $St=S_i$, where i=t mod T, where t is prediction time, and T is a program running resource usage period; and $S_i$ is an $i^{th}$ data point within a program running resource usage period, to which t corresponds, of the seasonal component; and a prediction function for the random component may be a constant, and the constant is an upper quantile of the random component.

Further, in this embodiment, the determining module may be configured to determine the overall prediction function for the program running resource according to the following formula:

$$R_t = (a+bt) + S_i + (\mu + k\sigma), \text{ where}$$

in the formula, $R_t$ is the overall prediction function for the program running resource; (a+bt) is the prediction function for the trend component, where a and b are constants; i=t mod T, where T is a program running resource usage period; and ($\mu+k\sigma$) is the prediction function for the random component, where $\mu$ is a mean value of data contained in the random component, $\sigma$ is a standard deviation of data contained in the random component, k is a constant, and a range of k is (0, 6].

Further, in this embodiment, the predicting module is configured to, according to the determined overall prediction function, predict program running resource usage at future set time, and/or predict time when the program running resource will be exhausted, and/or predict time when program running resource usage will reach a set threshold in the future.

Further, in this embodiment, the number of times of collecting program running resource usage is the same within each program running resource usage period.

Further, in this embodiment, the program running resource usage period is a period that is set according to a periodicity law of program running resource usage.

Figure 5:
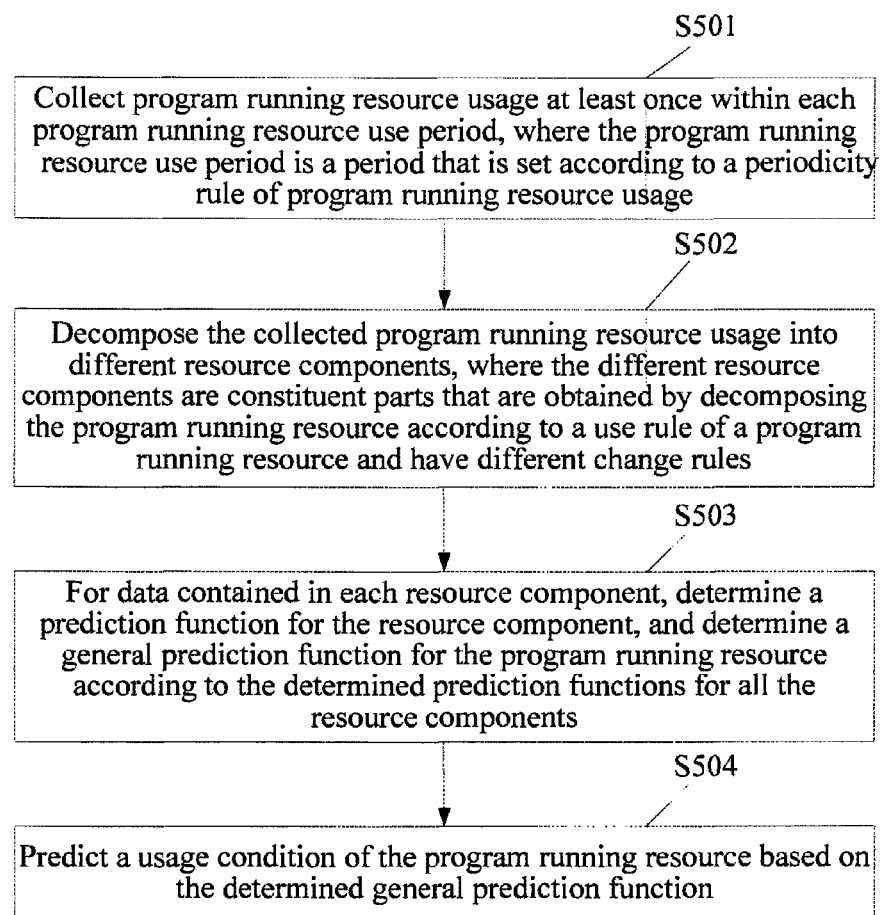
FIG. 5 is a flowchart of a method for predicting a usage condition of a program running resource provided in an embodiment of the present disclosure.

As shown in FIG. 5, FIG. 5 is a flowchart of a method for predicting a usage condition of a program running resource provided in an embodiment of the present disclosure. The method includes the following steps.

S501. Collect program running resource usage at least once within each program running resource usage period, where the program running resource usage period is a period that is set according to a periodicity law of program running resource usage.

S502. Decompose the collected program running resource usage into different resource components, where the different resource components are constituent parts that are obtained by decomposing the program running resource according to a use law of a program running resource and have different variation laws.

S503. For data contained in each resource component, determine a prediction function for the resource component, and determine an overall prediction function for the program running resource according to the determined prediction functions for all the resource components.

S504. Predict a usage condition of the program running resource based on the determined overall prediction function.

The program running resource in this embodiment of the present disclosure may be a memory resource or may also be a software resource such as a file handle, a semaphore, a database connection pool, or a thread pool that is needed for program running. In this embodiment of the present disclosure, a target object for which a usage condition of a program running resource is predicted may be of a different level, for example, may be a host, a virtual machine, a process, a process submodule, a memory partition of a process, or the like.

A basic concept of this embodiment of the present disclosure is as follows. A program running resource is decomposed, according to a use law of the program running resource, into constituent parts having different change rules, that is, different resource components, fitting and estimation are separately performed on each resource component, a prediction function for each resource component is determined, the determined prediction functions for all the resource components are then combined to obtain an overall prediction function for the program running resource, and a future usage condition of the program running resource is predicted according to the overall prediction function.

Preferably, before step S502, the method further includes determining that the total number of periods or the total number of times of collecting program running resource usage is not less than a set threshold, and/or a current program running resource occupancy rate is not less than a set threshold, and/or a current CPU occupancy rate is less than a set threshold, and/or current time falls within a set time range.

Preferably, the resource components obtained through decomposition include a seasonal component reflecting a periodic variation and a random component reflecting a random variation; or the resource components obtained through decomposition include a trend component reflecting a variation trend of program running resource usage and a random component reflecting a random variation; or the resource components obtained through decomposition include a trend component reflecting a variation trend of program running resource usage, a seasonal component reflecting a periodic variation, and a random component reflecting a random variation, where a prediction function for the trend component is a linear function or a nonlinear function that uses prediction time as an independent variable and is obtained by performing linear fitting or nonlinear fitting on data contained in the trend component; a prediction function for the seasonal component is $S_i$, where i=t mod T, where t is prediction time, and T is a program running resource usage period; and $S_i$ is an $i^{th}$ piece of program running resource usage within a program running resource usage period corresponding to t; and a prediction function for the random component is an upper confidence limit determined according to a mean value and a standard deviation of data contained in the random component.

As another option, a prediction function for the trend component may be a linear function or a nonlinear function that uses prediction time as an independent variable and is obtained by performing linear fitting or nonlinear fitting on data contained in the trend component; a prediction function for the seasonal component may be $St=S_i$, where $i=t \bmod T$, where t is prediction time, and T is a program running resource usage period; and $S_i$ is an $i^{th}$ data point within a program running resource usage period, to which t corresponds, of the seasonal component; and a prediction function for the random component may be a constant, and the constant is an upper quantile of the random component.

Further, in this embodiment, the determining an overall prediction function for the program running resource according to the determined prediction functions for all the resource components may include adding the determined prediction functions for all the resource components to obtain the overall prediction function for the program running resource.

Further, in this embodiment, the overall prediction function for the program running resource may be determined according to the following formula:

$$R_t=(a+bt)+S_i+(\mu+k\sigma), \text{ where}$$

in the formula, $R_t$ is the overall prediction function for the program running resource; (a+bt) is the prediction function for the trend component, where a and b are constants; $i=t \bmod T$, where T is a program running resource usage period; and ($\mu+k\sigma$) is the prediction function for the random component, where $\mu$ is a mean value of data contained in the random component, $\sigma$ is a standard deviation of data contained in the random component, k is a constant, and a range of k is (0, 6].

Further, in this embodiment, the number of times of collecting program running resource usage is the same within each program running resource usage period.

In an implementation process, a program running resource may be decomposed, according to a use law of the program running resource, into a seasonal component and a random component, or a trend component and a random component, or a trend component, a seasonal component, and a random component, where the trend component is a component reflecting a variation trend of program running resource usage, the seasonal component is a quantity representing that program running resource usage has a periodic variation rule, and the random component is a quantity representing a random variation in program running resource usage.

In an implementation process, if program running resource usage is decomposed into a trend component, a seasonal component, and a random component, a time sequence decomposition method such as a typical decomposition method or a Seasonal and Trend decomposition using Loess (STL) decomposition method may be used. The step of decomposing program running resource usage into a trend component, a seasonal component, and a random component is described below in detail using the typical decomposition method as an example.

It is assumed that the number of times of collecting program running resource usage within one period is an odd number N. For program running resource usage collected for one time, program running resource usage collected for (N−1)/2 times before this time, program running resource usage collected for (N−1)/2 times after this time, and the program running resource usage collected this time are added, and divided by the total number of times of collecting program running resource usage within one period, so as to obtain a numerical value of a trend component corresponding to the program running resource usage collected this time; the numerical value of the corresponding trend component is subtracted from the program running resource usage collected this time to obtain a sum value of a seasonal component and a random component corresponding to the program running resource usage collected this time; based on this, a mean value of a sum value of a seasonal component and a random component corresponding to program running resource usage collected for a corresponding number of times within each period is determined, and the mean value is used as a numerical value of a seasonal component corresponding to program running resource usage collected for a corresponding number of times within each period, that is, the numerical values of seasonal components of different periods are the same; and finally, the corresponding trend component and seasonal component are subtracted from program running resource usage collected this time, so as to obtain the random component corresponding to program running resource usage collected this time.

Figure 6:
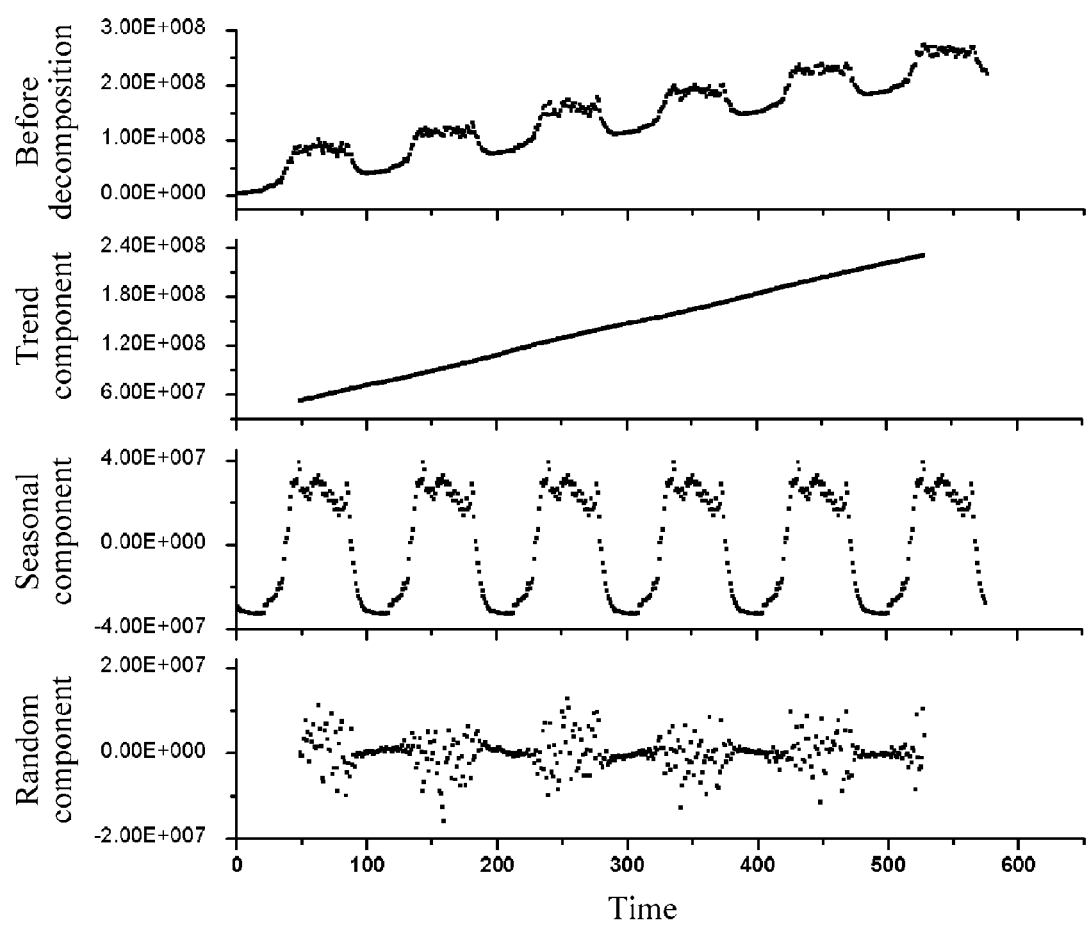
FIG. 6 is a schematic diagram of decomposing program running resource usage into a trend component, a seasonal component, and a random component using a typical time sequence decomposition method according to an embodiment of the present disclosure.

As shown in FIG. 6, FIG. 6 is a schematic diagram of decomposing program running resource usage into a trend component, a seasonal component, and a random component using a typical time sequence decomposition method according to this embodiment of the present disclosure. In FIG. 6, horizontal and vertical coordinate values are only used for illustration, and here specific description about units is not given. In FIG. 6, there is program running resource usage corresponding to six periods, and program running resource usage is separately collected for 96 times within each period.

Preferably, when the resource components include a trend component, a seasonal component, and a random component, the overall prediction function for the program running resource is determined according to the following formula:

$$R_t=(a+bt)+S_i+(\mu+k\sigma), \text{ where}$$

in the formula, $R_t$ is the overall prediction function for the program running resource; (a+bt) is the prediction function for the trend component, where a and b are constants; and ($\mu+k\sigma$) is the prediction function for the random component, where $\mu$ is the mean value of data contained in the random component, $\sigma$ is the standard deviation of data contained in the random component, and k is a constant.

In an implementation process, the prediction function for the trend component may be a linear function in the foregoing formula, or may also be a nonlinear function obtained through fitting, for example, a quadratic function, an exponential function, a logarithmic function, a polynomial, Gompertz, or Logistic. According to the foregoing analysis on a characteristic of the seasonal component, data of the seasonal component of each period is the same, and therefore, a seasonal component of one period may be used to predict future program running resource usage. In this embodiment of the present disclosure, the prediction function for the seasonal component is $S_i$, where $i=t \bmod T$, where mod indicates to obtain a remainder from t divided by T, t is prediction time, and T is a program running resource usage period; and $S_i$ is an $i^{th}$ piece of program running resource usage within a program running resource usage period corresponding to t. During prediction, which piece of program running resource usage of the program running resource usage period to which the prediction time t corresponds is determined, and data of a seasonal component corresponding to t is determined according to determined $S_i$; for the random component, although a precise value of the random component at certain time in the future cannot be predicted, a mean value $\mu$ and a standard deviation $\sigma$ of the random component can be determined according to existing data of the random component, and then a certain upper confidence limit such as μ+kσ is used as an estimated value of the random component, where k is a constant.

Preferably, the predicting a usage condition of the program running resource based on the determined overall prediction function in the foregoing step S504 includes, according to the determined overall prediction function, predicting program running resource usage at future set time, and/or predicting when the program running resource will be exhausted, and/or predicting when program running resource usage will reach a set threshold in the future.

In an implementation process, according to a determined overall prediction function, a usage condition of a program running resource can be predicted. For example, if the foregoing $R_t$ is made equal to a set threshold of program running resource usage, time when program running resource usage will reach a set threshold in the future can be obtained; if the foregoing $R_t$ is made equal to the total available program running resource, time when the program running resource will be exhausted can be obtained; if t is made equal to certain set time in the future, program running resource usage at the time t in the future can be obtained.

A typical implementation manner for predicting a usage condition of a program running resource is provided below.

Figure 7:
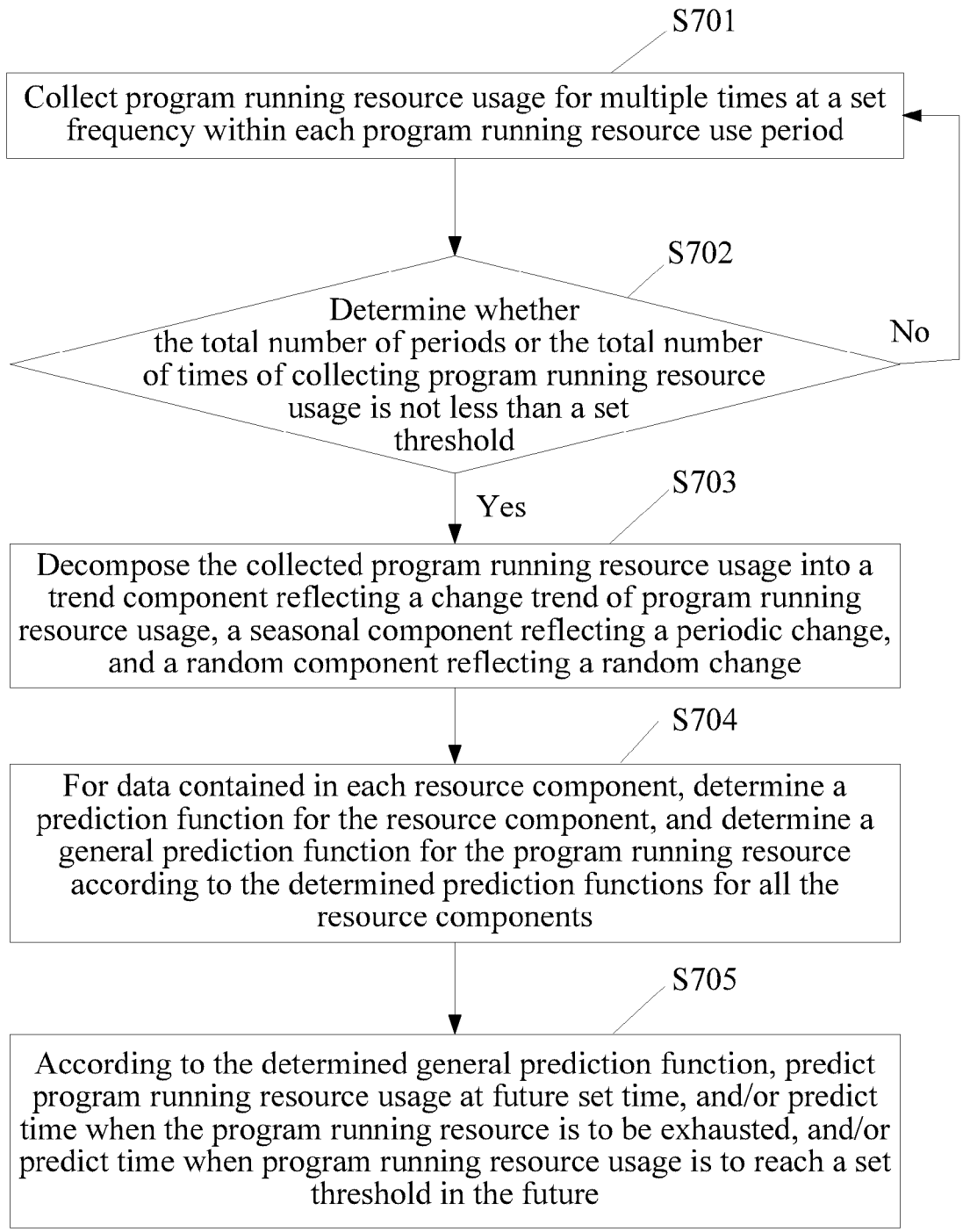
FIG. 7 is a flowchart of a method for predicting a usage condition of a program running resource provided in an exemplary embodiment of the present disclosure.

As shown in FIG. 7, FIG. 7 is a flowchart of a method for predicting a usage condition of a program running resource provided in an exemplary embodiment of the present disclosure. The method includes the following steps.

S701. Collect program running resource usage for multiple times at a set frequency within each program running resource usage period.

S702. Determine whether the total number of periods or the total number of times of collecting program running resource usage is not less than a set threshold, and if yes, perform step S703; otherwise, return to step S701.

In an implementation process, other determining conditions may further be set, for example, whether a current program running resource occupancy rate is not less than a set threshold, whether a current CPU occupancy rate is less than a set threshold, and whether current time falls within a set time range.

S703. Decompose the collected program running resource usage into a trend component reflecting a variation trend of program running resource usage, a seasonal component reflecting a periodic variation, and a random component reflecting a random variation.

S704. For data contained in each resource component, determine a prediction function for the resource component, and determine an overall prediction function for the program running resource according to the determined prediction functions for all the resource components.

In an implementation process, the prediction function for the trend component may be a linear function or a nonlinear function that uses prediction time as an independent variable and is obtained by performing linear fitting or nonlinear fitting on data contained in the trend component; the prediction function for the seasonal component is $S_i$, where i=t mod T, where t is prediction time, and T is a program running resource usage period; and $S_i$ is an $i^{th}$ piece of program running resource usage within a program running resource usage period corresponding to t; and the prediction function for the random component is an upper confidence limit determined according to a mean value and a standard deviation of data contained in the random component.

S705. According to the determined overall prediction function, predict program running resource usage at future set time, and/or predict time when the program running resource will be exhausted, and/or predict time when program running resource usage will reach a set threshold in the future.

In an implementation process, methods for determining a leak of a program running resource and predicting a usage condition of a program running resource in the embodiments of the present disclosure may be combined. A process for determining a leak of a program running resource and a process for predicting a usage condition of a program running resource may be performed at the same time, or may also be performed in a time order. A memory resource in a program running resource is used as an example below, and an implementation manner of combined application of methods for determining a memory leak and predicting a usage condition of memory is provided below.

Figure 8:
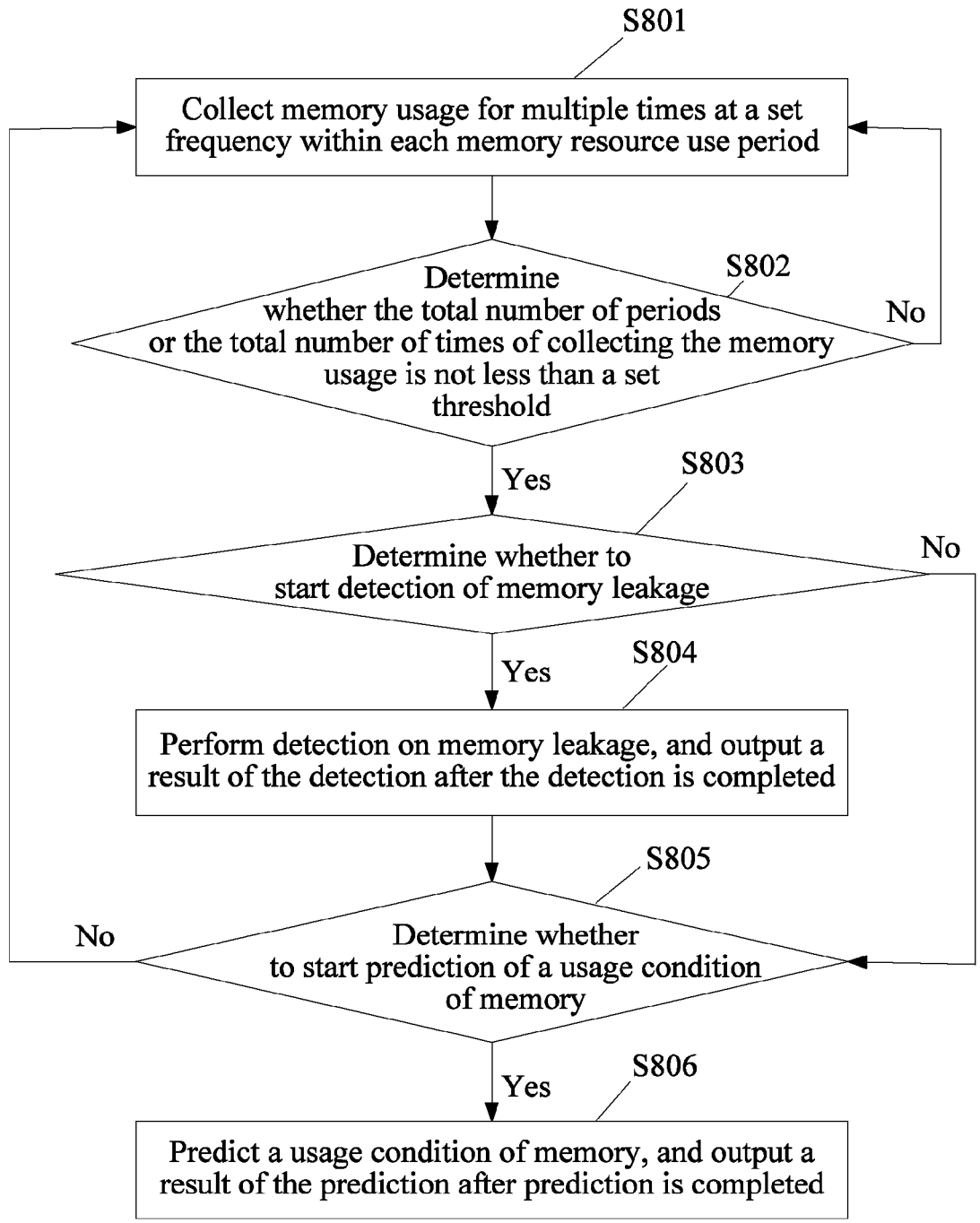
FIG. 8 is a flowchart of an overall method for detecting a memory leak and predicting a usage condition of memory provided in an embodiment of the present disclosure.

As shown in FIG. 8, FIG. 8 is a flowchart of an overall method for detecting a memory leak and predicting a usage condition of memory provided in an embodiment of the present disclosure. The overall method includes the following steps.

S801. Collect memory usage for multiple times at a set frequency within each memory resource usage period.

S802. Determine whether the total number of periods or the total number of times of collecting memory usage is not less than a set threshold, and if yes, perform step S803; otherwise, return to step S801.

In an implementation process, other conditions to start detection of a memory leak may further be set, for example, a condition that a current memory occupancy rate is not less than a set threshold, a condition that a current CPU occupancy rate is less than a set threshold, and a condition that current time falls within a set time range.

S803. Determine whether to start detection of memory leakage, and if yes, perform step S804; otherwise perform step S805.

S804. Perform detection on memory leakage, output a result of the detection after the detection is completed, and then perform step S805.

Here, for the detection process, reference may be made to the foregoing method for determining a leak of a program running resource, and the detection process is no longer elaborated herein.

S805. Determine whether to start prediction of a usage condition of memory, and if yes, perform step S806; otherwise, return to step S801.

S806. Predict a usage condition of memory, and output a result of the prediction after prediction is completed.

Here, for a prediction process, refer to the foregoing method for predicting a usage condition of a program running resource, and the prediction process is no longer elaborated herein.

Figure 9:
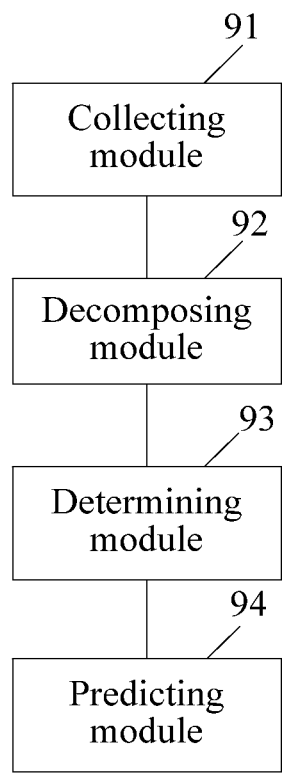
FIG. 9 is a schematic structural diagram of an apparatus for predicting a usage condition of a program running resource provided in an embodiment of the present disclosure.

As shown in FIG. 9, FIG. 9 is a schematic structural diagram of an apparatus for predicting a usage condition of a program running resource provided in an embodiment of the present disclosure. The apparatus includes a collecting module 91 configured to collect program running resource usage at least once within each program running resource usage period, and transmit the collected program running resource usage to a decomposing module 92, where the program running resource usage period is a period that is set according to a periodicity law of program running resource usage; the decomposing module 92 configured to receive the program running resource usage collected by the collecting module 91, decompose the collected program running resource usage into different resource components, and transmit data contained in each resource component to a determining module 93, where the different resource components are constituent parts that are obtained by decomposing the program running resource according to a use law of a program running resource and have different variation laws; the determining module 93 configured to receive the data contained in each resource component obtained through decomposition by the decomposing module 92, for data contained in each resource component, determine a prediction function for the resource component, determine an overall prediction function for the program running resource according to the determined prediction functions for all the resource components, and transmit the determined overall prediction function to a predicting module 94; and the predicting module 94 configured to receive the overall prediction function determined by the determining module 93, and predict a usage condition of the program running resource based on the overall prediction function.

Further, in this embodiment, the decomposing module may be configured to decompose the collected program running resource usage into a seasonal component reflecting a periodic variation in program running resource usage and a random component reflecting a random variation in program running resource usage; or decompose the collected program running resource usage into a trend component reflecting a variation trend of program running resource usage and a random component reflecting a random variation in program running resource usage; or decompose the collected program running resource usage into a trend component reflecting a variation trend of program running resource usage, a seasonal component reflecting a periodic variation in program running resource usage, and a random component reflecting a random variation in program running resource usage.

Further, in this embodiment, a prediction function for the trend component may be a linear function or a nonlinear function that uses prediction time as an independent variable and is obtained by performing linear fitting or nonlinear fitting on data contained in the trend component; a prediction function for the seasonal component may be $St=S_i$, where $i=t \bmod T$, where t is prediction time, and T is a program running resource usage period; and $S_i$ is an $i^{th}$ data point within a program running resource usage period, to which t corresponds, of the seasonal component; and a prediction function for the random component may be a constant, and the constant is an upper quantile of the random component.

Further, in this embodiment, when the determining module is configured to determine the overall prediction function for the program running resource according to the determined prediction functions for all the resource components, the determining module may be configured to add the determined prediction functions for all the resource components to obtain the overall prediction function for the program running resource.

Further, in this embodiment, when the determining module is configured to determine the overall prediction function for the program running resource according to the determined prediction functions for all the resource components, the determining module may be configured to determine the overall prediction function for the program running resource according to the following formula:

$$R_t=(a+bt)+S_i+(\mu+k\sigma), \text{ where}$$

in the formula, $R_t$ is the overall prediction function for the program running resource; (a+bt) is the prediction function for the trend component, where a and b are constants; $i=t \bmod T$, where T is a program running resource usage period; and $(\mu+k\sigma)$ is the prediction function for the random component, where μ is a mean value of data contained in the random component, σ is a standard deviation of data contained in the random component, k is a constant, and a range of k is (0, 6].

Preferably, the determining module 93 is further configured to, before the collecting module 91 decomposes the collected program running resource usage into different resource components, determine that the total number of periods or the total number of times of collecting program running resource usage is not less than a set threshold, and/or a current program running resource occupancy rate is not less than a set threshold, and/or a current CPU occupancy rate is less than a set threshold, and/or current time falls within a set time range.

Preferably, the resource components obtained through decomposition by the decomposing module 92 include a seasonal component reflecting a periodic variation and a random component reflecting a random variation; or the resource components obtained through decomposition by the decomposing module 92 include a trend component reflecting a variation trend of program running resource usage and a random component reflecting a random variation; or the resource components obtained through decomposition by the decomposing module 92 include a trend component reflecting a variation trend of program running resource usage, a seasonal component reflecting a periodic variation, and a random component reflecting a random variation, where a prediction function for the trend component is a linear function or a nonlinear function that uses prediction time as an independent variable and is obtained by performing linear fitting or nonlinear fitting on data contained in the trend component; a prediction function for the seasonal component is $S_i$, where $i=t \bmod T$, where t is prediction time, and T is a program running resource usage period; and $S_i$ is an $i^{th}$ piece of program running resource usage within a program running resource usage period corresponding to t; and a prediction function for the random component is an upper confidence limit determined according to a mean value and a standard deviation of data contained in the random component.

Preferably, the determining module 93 is configured to, when the resource components obtained through decomposition by the decomposing module 92 include a trend component, a seasonal component, and a random component, determine the overall prediction function for the program running resource according to the following formula:

$$R_t=(a+bt)+S_i+(\mu+k\sigma), \text{ where}$$

in the formula, $R_t$ is the overall prediction function for the program running resource; (a+bt) is the prediction function for the trend component, where a and b are constants; and $(\mu+k\sigma)$ is the prediction function for the random component, where μ is the mean value of data contained in the random component, σ is the standard deviation of data contained in the random component, and k is a constant.

Preferably, the predicting module 94 is configured to, according to the determined overall prediction function, predict program running resource usage at future set time, and/or predict time when the program running resource will be exhausted, and/or predict time when program running resource usage will reach a set threshold in the future.

Further, in this embodiment, the number of times of collecting program running resource usage is the same within each program running resource usage period.

Figure 10:
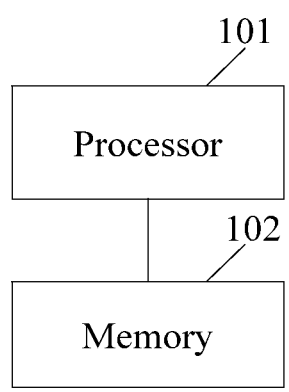
FIG. 10 is a structural diagram of an apparatus for predicting a usage condition of a program running resource provided in an embodiment of the present disclosure.

As shown in FIG. 10, FIG. 10 is a structural diagram of an apparatus for predicting a usage condition of a program running resource provided in an embodiment of the present disclosure. The apparatus includes a processor 101 configured to collect program running resource usage at least once within each program running resource usage period, and decompose the collected program running resource usage into different resource components, where the different resource components are constituent parts that are obtained by decomposing the program running resource according to a use law of a program running resource and have different variation laws, and the program running resource usage period is a period that is set according to a periodicity law of program running resource usage; and for data contained in each resource component, determine a prediction function for the resource component, determine an overall prediction function for the program running resource according to the determined prediction functions for all the resource components, and predict a usage condition of the program running resource based on the determined overall prediction function; and a memory 102 configured to store the program running resource usage collected each time, the determined prediction function for each resource component, and the overall prediction function for the program running resource.

Further, in this embodiment, the decomposing the collected program running resource usage into different resource components includes decomposing the collected program running resource usage into a seasonal component reflecting a periodic variation in program running resource usage and a random component reflecting a random variation in program running resource usage; or decomposing the collected program running resource usage into a trend component reflecting a variation trend of program running resource usage and a random component reflecting a random variation in program running resource usage; or decomposing the collected program running resource usage into a trend component reflecting a variation trend of program running resource usage, a seasonal component reflecting a periodic variation in program running resource usage, and a random component reflecting a random variation in program running resource usage.

Further, in this embodiment, a prediction function for the trend component is a linear function or a nonlinear function that uses prediction time as an independent variable and is obtained by performing linear fitting or nonlinear fitting on data contained in the trend component; a prediction function for the seasonal component is $St=S_i$, where $i=t \bmod T$, where t is prediction time, and T is a program running resource usage period; and $S_i$ is an $i^{th}$ data point within a program running resource usage period, to which t corresponds, of the seasonal component; and a prediction function for the random component is a constant, and the constant is an upper quantile of the random component.

Further, in this embodiment, the determining an overall prediction function for the program running resource according to the determined prediction functions for all the resource components includes adding the determined prediction functions for all the resource components to obtain the overall prediction function for the program running resource.

Further, in this embodiment, the overall prediction function for the program running resource is determined according to the following formula:

$$R_t=(a+bt)+S_i+(\mu+k\sigma), \text{ where}$$

in the formula, $R_t$ is the overall prediction function for the program running resource; (a+bt) is the prediction function for the trend component, where a and b are constants; $i=t \bmod T$, where T is a program running resource usage period; and ($\mu+k\sigma$) is the prediction function for the random component, where $\mu$ is a mean value of data contained in the random component, $\sigma$ is a standard deviation of data contained in the random component, k is a constant, and a range of k is (0, 6].

Preferably, the processor 101 is further configured to, before the collected program running resource usage is decomposed into different resource components, determine that the total number of periods or the total number of times of collecting program running resource usage is not less than a set threshold, and/or a current program running resource occupancy rate is not less than a set threshold, and/or a current CPU occupancy rate is less than a set threshold, and/or current time falls within a set time range.

Preferably, the resource components include a seasonal component reflecting a periodic variation and a random component reflecting a random variation; or the resource components include a trend component reflecting a variation trend of program running resource usage and a random component reflecting a random variation; or the resource components include a trend component reflecting a variation trend of program running resource usage, a seasonal component reflecting a periodic variation, and a random component reflecting a random variation, where a prediction function for the trend component is a linear function or a nonlinear function that uses prediction time as an independent variable and is obtained by performing linear fitting or nonlinear fitting on data contained in the trend component; a prediction function for the seasonal component is $S_i$, where $i=t \bmod T$, where t is prediction time, and T is a program running resource usage period; and $S_i$ is an $i^{th}$ piece of program running resource usage within a program running resource usage period corresponding to t; and a prediction function for the random component is an upper confidence limit determined according to a mean value and a standard deviation of data contained in the random component.

Preferably, the processor 101 is configured to, when the resource components include a trend component, a seasonal component, and a random component, determine the overall prediction function for the program running resource according to the following formula:

$$R_t=(a+bt)+S_i+(\mu+k\sigma), \text{ where}$$

in the formula, $R_t$ is the overall prediction function for the program running resource; (a+bt) is the prediction function for the trend component, where a and b are constants; and ($\mu+k\sigma$) is the prediction function for the random component, where $\mu$ is the mean value of data contained in the random component, $\sigma$ is the standard deviation of data contained in the random component, and k is a constant.

Preferably, the processor 101 is configured to, according to the determined overall prediction function, predict program running resource usage at future set time, and/or predict time when the program running resource will be exhausted, and/or predict time when program running resource usage will reach a set threshold in the future.

Figure 11:
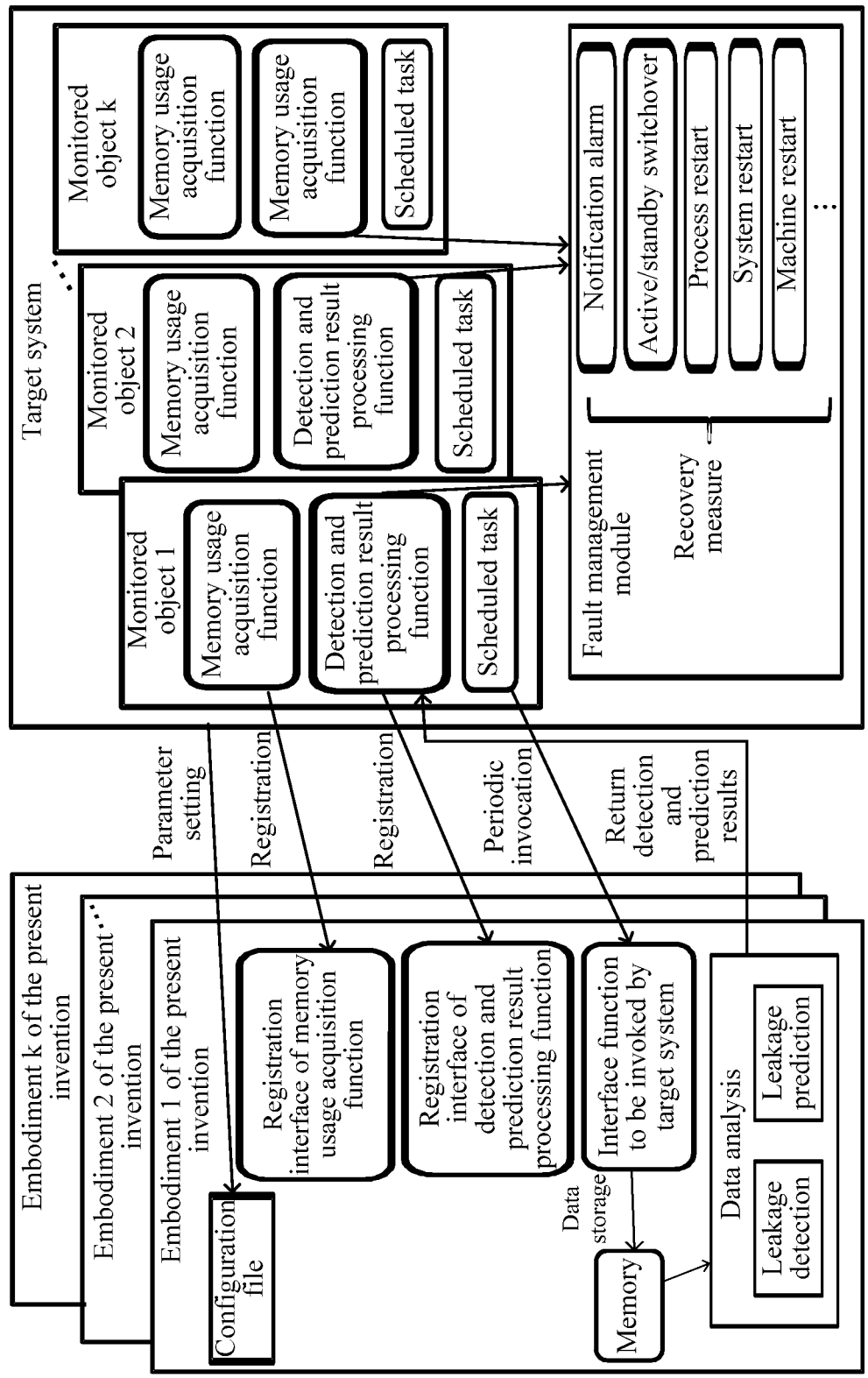
FIG. 11 is a schematic diagram of deployment of apparatuses for detecting a leak of a resource and predicting a usage condition of a resource according to an embodiment of the present disclosure.

As shown in FIG. 11, FIG. 11 is a schematic diagram of deployment of apparatuses for detecting a leak of a resource and predicting a usage condition of a resource according to an embodiment of the present disclosure.

In an implementation process, if it needs to be detected whether there is a leak of a program running resource in a certain monitored object in a target system and/or a usage condition of a program running resource of the monitored object needs to be predicted, an apparatus in an embodiment of the present disclosure may be deployed for the monitored object. If whether there is a leak of a program running resource in multiple monitored objects in a target system needs to be detected and/or usage conditions of program running resources of multiple monitored objects need to be predicted, an apparatus in an embodiment of the present disclosure may be deployed for each of the monitored objects.

In an implementation process, this apparatus may be deployed online, that is, data collection and data analysis are both performed in a target system, or online deployment and offline deployment may also be combined, that is, only program running resource usage is collected in a target system, while data analysis, that is, a process of determining of a leak of a program running resource and/or prediction of a usage condition of a program running resource, may be performed offline.

An interaction process between a target system and the apparatuses for detecting a leak of a resource and predicting a usage condition of a resource in this embodiment of the present disclosure is described below in detail using a memory resource as an example.

The target system sets, using a configuration file of the apparatuses, related parameters, such as the number of times of collecting usage of memory within one period, a significance level of a leak detection, that is, a in the foregoing implementation manner, a value of k in a prediction function for a random component, and a memory utilization or a usage threshold to start determining of whether there is a memory leak.

The target system registers with the apparatuses a hook function for acquiring memory usage, such that during running, the apparatuses invoke the function to collect memory usage of a target monitored object.

The target system registers with the apparatuses a hook function for processing detection and prediction results, such that the apparatuses invoke the function to notify the target system of detection and prediction results, and the target system performs, according to the results, corresponding processing, such as notification alarm, active/standby switchover, process restart, operating system restart, and machine restart.

The target system periodically invokes, using scheduled tasks, external interface functions provided by the apparatuses, and the external interface functions of the apparatuses invoke the hook function that is registered with the apparatuses by the target system and is used for acquiring usage of memory, to collect memory usage of a monitored object, store the collected data to memory, and use the collected data to execute the process of detecting a memory leak and predicting a usage condition of memory.

Persons skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer-available storage media (including but not limited to a disk memory, a compact disc read-only memory (CD-ROM), an optical memory, and the like) that include computer-available program code.

The present disclosure is described with reference to the flowcharts and/or block diagrams of the method, the apparatus (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for an overall-purpose computer, a dedicated computer, an embedded processor, or a processor of any other programmable data processing device to generate a machine, such that the instructions executed by the computer or the processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, such that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, such that a series of operations and steps are performed on the computer or the other programmable device, thereby generating computer-implemented processing. Therefore, the instructions executed on the computer or the other programmable device provide steps for implementing a specific function in one or more processes in the flowcharts and/or in one or more blocks in the block diagrams.

Although some exemplary embodiments of the present disclosure have been described, persons skilled in the art can make changes and modifications to these embodiments once they learn the basic inventive concept. Therefore, the following claims are intended to be construed as to cover the exemplary embodiments and all changes and modifications falling within the scope of the present disclosure.

Obviously, persons skilled in the art can make various modifications and variations to the present disclosure without departing from the spirit and scope of the present disclosure. The present disclosure is intended to cover these modifications and variations provided that they fall within the scope of protection defined by the following claims and their equivalent technologies.

What is claimed is:

1. A method for predicting usage of a program resource during running of a program, the method comprising:

collecting, at least once within each period of a plurality of periods of usage of a program resource, resource usage data for the program resource while a program using the program resource is running;

decomposing the resource usage data collected for the plurality of periods into a trend component reflecting a variation trend of program running resource usage, a seasonal component reflecting a periodic variation in the program running resource usage, and a random component reflecting a random variation in the program running resource usage;

determining a first prediction function for the trend component, a second prediction function for the seasonal component, and a third prediction function for the random component, wherein the second prediction function for the seasonal component is an $i^{th}$ data point of the seasonal component, wherein i=t mod T, wherein t is prediction time, and T represents a duration of each period of the plurality of periods;

adding together the first prediction function, the second prediction function, and the third prediction function to obtain an overall prediction function for the program resource; and predicting the usage of the program resource based on the overall prediction function, wherein predicting the usage includes at least one of predicting program running resource usage at a future set time, predicting when the program resource will be exhausted, or predicting when program running resource usage will reach a set threshold in the future.

2. The method according to claim 1, wherein the first prediction function for the trend component is a linear function or a nonlinear function that uses prediction time as an independent variable and is obtained by performing linear fitting or nonlinear fitting on resource usage data contained in the trend component, and wherein the third prediction function for the random component is a constant, and the constant is an upper quantile of the random component.

3. The method according to claim 1, wherein the overall prediction function for the program resource is determined according to the following formula:

$$R_t=(a+bt)+S_t+(\mu+k\sigma),$$

wherein in the formula, $R_t$ is the overall prediction function for the program resource, (a+bt) is the first prediction function for the trend component, wherein a and b are constants, wherein $S_t$ is the second prediction function for the seasonal component, and ($\mu+k\sigma$) is the third prediction function for the random component, and wherein $\mu$ is a mean value of data contained in the random component, $\sigma$ is a standard deviation of data contained in the random component, k is a constant, and a range of k is (0, 6].

4. The method according to claim 1, further comprising performing the decomposing based on determining that a central processing unit occupancy rate is less than a second set threshold.

5. The method according to claim 1, wherein a number of times of collecting resource usage data is the same within each period of the plurality of periods.

6. The method according to claim 1, further comprising performing the decomposing based on determining that an occupancy rate of the program resource is not less than a second set threshold.

7. An apparatus for predicting usage of a program resource during running of a program, the apparatus comprising:
a computer processor configured to:
collect, at least once within each period of a plurality of periods of usage of a program resource, resource usage data for the program resource while a program using the program resource is running;
decompose the resource usage data collected for the plurality of periods into a trend component reflecting a variation trend of program running resource usage, a seasonal component reflecting a periodic variation in the program running resource usage, and a random component reflecting a random variation in the program running resource usage;
determine a first prediction function for the trend component, a second prediction function for the seasonal component, and a third prediction function for the random component, wherein the second prediction function is an $i^{th}$ data point of the seasonal component, wherein i=t mod T, wherein t is prediction time, and T represents a duration of each period of the plurality of periods;
add together the first prediction function, the second prediction function, and the third prediction function to obtain an overall prediction function for the program resource; and
predict the usage of the program resource based on the overall prediction function, wherein predicting the usage includes at least one of predicting program resource usage at a future set time, predicting when the program resource will be exhausted, or predicting when program resource usage will reach a set threshold in the future.

8. The apparatus according to claim 7, wherein the first prediction function for the trend component is a linear function or a nonlinear function that uses prediction time as an independent variable and is obtained by performing linear fitting or nonlinear fitting on resource usage data contained in the trend component, and wherein the third prediction function for the random component is a constant, and the constant is an upper quantile of the random component.

9. The apparatus according to claim 7, wherein the computer processor is configured to determine the overall prediction function for the program resource according to the following formula:

$$R_t=(a+bt)+S_t+(\mu+k\sigma),$$

wherein in the formula, $R_t$ is the overall prediction function for the program resource, (a+bt) is the first prediction function for the trend component, wherein a and b are constants; wherein $S_t$ is the second prediction function for the seasonal component, and ($\mu+k\sigma$) is the third prediction function for the random component, and wherein $\mu$ is a mean value of data contained in the random component, $\sigma$ is a standard deviation of data contained in the random component, k is a constant, and a range of k is (0, 6].

10. The apparatus according to claim 7, wherein the computer processor is further configured to initiate the decomposition based on determining that a central processing unit occupancy rate is less than a second set threshold.

11. The apparatus according to claim 7, wherein a number of times of collecting resource usage data is the same within each period of the plurality of periods.

12. The apparatus according to claim 7, wherein the computer processor is further configured to initiate the decomposition based on determining that an occupancy rate of the program resource is not less than a second set threshold.

13. A method for determining a leak of a program resource, the method comprising:
collecting, at least once within each period of a plurality of periods of usage of a program resource, resource usage data for the program resource while a program using the program resource is running, wherein a number of times of collecting resource usage data is the same within each period of the plurality of periods;
determining, for every two periods of the plurality of periods and for each program running resource usage sample collected within a latter period, a difference value between the program running resource usage sample collected within the latter period and a corresponding program running resource usage sample collected within a former period, wherein a first time difference between time when collection is performed each time within the latter period and start time of the latter period and a second time difference between time when collection is performed for the former period and start time of the former period fall within a preset range, and the preset range is at least one of a duration range smaller than a minimum time interval among time intervals between every two adjacent times of collection within the former period or a duration range smaller than a minimum time interval among time intervals between every two adjacent times of collection within the latter period; and determining that there is a leak of the program resource when a difference between a total number of difference values greater than 0 and a total number of difference values less than 0 among the determined difference values is greater than a set threshold, wherein a range of the set threshold is greater than or equal to 0, and is less than or equal to 70% of a sum of the total number of difference values greater than 0 and the total number of difference values less than 0 among the determined difference values.

14. A method for determining a leak of a program resource, the method comprising:

collecting, at least once within each period of a plurality of periods of usage of a program resource, resource usage data for the program resource while a program using the program resource is running, wherein a number of times of collecting resource usage data is the same within each period of the plurality of periods;

determining, for every two periods of the plurality of periods and for each program running resource usage sample collected within a latter period, a difference value between the program running resource usage sample collected within the latter period and a corresponding program running resource usage sample collected within a former period, wherein a first time difference between time when collection is performed each time within the latter period and start time of the latter period and a second time difference between time when collection is performed for the former period and start time of the former period fall within a preset range, and the preset range is at least one of a duration range smaller than a minimum time interval among time intervals between every two adjacent times of collection within the former period or a duration range smaller than a minimum time interval among time intervals between every two adjacent times of collection within the latter period;

determining a statistic Z of a difference between a total number of difference values greater than 0 and a total number of difference values less than 0; and determining that there is a leak of the program resource when Z is greater than a set threshold, wherein the statistic Z of the difference S' between the total number of difference values greater than 0 and the total number of difference values less than 0 is determined according to the following formula:

when $$n \geq 10, Z = \frac{S'}{[\mathrm{VAR}(S')]^{1/2}},$$

wherein n is the number of the plurality of periods;

otherwise, $$Z = \begin{cases} \frac{(S'-1)}{[\mathrm{VAR}(S')]^{1/2}}, & S' > 0 \\ 0, & S' = 0, \\ \frac{(S'+1)}{[\mathrm{VAR}(S')]^{1/2}}, & S' < 0 \end{cases}$$

wherein $$S_i = \sum_{k=1}^{n-1} \sum_{l=k+1}^{n} \mathrm{sgn}(R_{il} - R_{ik}),$$

$$S' = \sum_{i=1}^{m} S_i,$$

$$\mathrm{VAR}(S') = \sum_{i=1}^{m} \mathrm{VAR}(S_i),$$

$R_{ik}$ is resource usage data collected for an $i^{th}$ time within a $k^{th}$ period of the plurality of periods, $R_{il}$ is resource usage data collected for an $i^{th}$ time within a 1st period of the plurality of periods, and m is the number of times of collecting resource usage data within one period of the plurality of periods, and wherein the set threshold is a quantile value determined according to a probability distribution of the statistic Z.

15. An apparatus for determining a leak of a program running resource, comprising:

a computer processor configured to:

collect, at least once within each period of a plurality of periods of usage of a program resource, resource usage data for the program resource while a program using the program resource is running, wherein a number of times of collecting resource usage data is the same within each period of the plurality of periods;

determine, for every two periods of the plurality of periods and for each program running resource usage sample collected within a latter period, a difference value between the program running resource usage sample collected within the latter period and a corresponding program running resource usage sample collected within a former period, wherein a first time difference between time when collection is performed each time within the latter period and start time of the latter period and a second time difference between time when collection is performed for the former period and start time of the former period fall within a preset range, and the preset range is at least one of a duration range smaller than a minimum time interval among time intervals between every two adjacent times of collection within the former period or a duration range smaller than a minimum time interval among time intervals between every two adjacent times of collection within the latter period; and determine, when a difference between a total number of difference values greater than 0 and a total number of difference values less than 0 among the determined difference values is greater than a set threshold, that there is a leak of the program resource, wherein a range of the threshold is greater than or equal to 0, and is less than or equal to 70% of a sum of the total number of difference values greater than 0 and the total number of difference values less than 0 among the determined difference values.

16. An apparatus for determining a leak of a program resource, the apparatus comprising:

a computer processor configured to:
collect, at least once within each period of a plurality of periods of usage of a program resource, resource usage data for the program resource while a program using the program resource is running, wherein a number of times of collecting resource usage data is the same within each period of the plurality of periods;
determine, for every two periods of the plurality of periods and for each program running resource usage sample collected within a latter period, a difference value between the program running resource usage sample collected within the latter period and a corresponding program running resource usage sample collected within a former period, wherein a first time difference between time when collection is performed each time within the latter period and start time of the latter period and a second time difference between time when collection is performed for the former period and start time of the former period fall within a preset range, and the preset range is at least one of a duration range smaller than a minimum time interval among time intervals between every two adjacent times of collection within the former period or a duration range smaller than a minimum time interval among time intervals between every two adjacent times of collection within the latter period; and
determine a statistic Z of a difference between a total number of difference values greater than 0 and a total number of difference values less than 0, and when Z is greater than a set threshold, determine that there is a leak of the program resource, wherein the computer processor is configured to determine the statistic Z of the difference S' between the total number of difference values greater than 0 and the total number of difference values less than 0 according to the following formula:
when $$n \geq 10, Z = \frac{S'}{[VAR(S')]^{1/2}},$$

wherein n is the number of the plurality of periods; otherwise, $$Z = \begin{cases} \frac{(S'-1)}{[VAR(S')]^{1/2}}, & S' > 0 \\ 0, & S' = 0, \\ \frac{(S'+1)}{[VAR(S')]^{1/2}}, & S' < 0 \end{cases}$$

wherein $$S_i = \sum_{k=1}^{n-1} \sum_{l=k+1}^{n} \text{sgn}(R_{il} - R_{ik}),$$

$$S' = \sum_{i=1}^{m} S_i,$$

$$VAR(S') = \sum_{i=1}^{m} VAR(S_i),$$

$R_{ik}$ is program running resource usage data collected for an $i^{th}$ time within a $k^{th}$ period of the plurality of periods, $R_{il}$ is resource usage data collected for an $i^{th}$ time within a 1st period of the plurality of periods, and m is the number of times of collecting resource usage data within one period of the plurality of periods, and wherein the threshold is a quantile value determined according to a probability distribution of the statistic Z.

17. A method for determining a leak of a program resource, the method comprising:
determining whether to perform detection of memory leakage based on whether a current central processing unit occupancy rate is less than a first set threshold;
collecting, at least once within each period of a plurality of periods of usage of a program resource, resource usage data for the program resource while a program using the program resource is running, wherein a number of times of collecting resource usage data is the same within each period of the plurality of periods;
determining, for any two periods of the plurality of periods and for each program running resource usage sample collected within a latter period, a difference value between the program running resource usage sample collected within the latter period and a corresponding program running resource usage sample collected within a former period, wherein a first time difference between time when collection is performed each time within the latter period and start time of the latter period and a second time difference between time when collection is performed for the former period and start time of the former period fall within a preset range; and
determining whether there is a leak of the program resource according to a difference between a total number of difference values greater than 0 and a total number of difference values less than 0 among the determined difference values, wherein determining whether there is the leak comprises determining that there is the leak of the program resource when the difference between the total number of difference values greater than 0 and the total number of difference values less than 0 is greater than a second set threshold.

18. The method according to claim 17, wherein the preset range is at least one of a duration range smaller than a minimum time interval among time intervals between every two adjacent times of collection within the former period and a duration range smaller than a minimum time interval among time intervals between every two adjacent times of collection within the latter period.

19. The method according to claim 17, wherein a range of the second set threshold is greater than or equal to 0, and is less than or equal to 70% of a sum of the total number of difference values greater than 0 and the total number of difference values less than 0 among the determined difference values.

20. The method according to claim 17, wherein determining whether there is the leak of the program resource according to the difference between the total number of difference values greater than 0 and the total number of difference values less than 0 comprises:
determining a statistic Z of the difference between the total number of difference values greater than 0 and the total number of difference values less than 0; and
determining that there is the leak of the program resource when Z is greater than the second set threshold.

21. The method according to claim 20, wherein the statistic Z of the difference S' between the total number of difference values greater than 0 and the total number of difference values less than 0 is determined according to the following formula:

when $$n \geq 10, Z = \frac{S'}{[VAR(S')]^{1/2}},$$

wherein n is the number of the plurality of periods; otherwise, $$Z = \begin{cases} \frac{(S'-1)}{[VAR(S')]^{1/2}}, & S' > 0 \\ 0, & S' = 0, \\ \frac{(S'+1)}{[VAR(S')]^{1/2}}, & S' < 0 \end{cases}$$

wherein $$S_i = \sum_{k=1}^{n-1} \sum_{l=k+1}^{n} \text{sgn}(R_{il} - R_{ik}),$$

$$S' = \sum_{i=1}^{m} S_i,$$

$$VAR(S') = \sum_{i=1}^{m} VAR(S_i),$$

$R_{ik}$ is resource usage data collected for an $i^{th}$ time within a $k^{th}$ period of the plurality of periods, $R_{il}$ is resource usage data collected for an $i^{th}$ time within a 1st period of the plurality of periods, and m is the number of times of collecting resource usage data within one period of the plurality of periods.

22. The method according to claim 20, wherein the second set threshold is a quantile value determined according to a probability distribution of the statistic Z.

23. An apparatus for determining a leak of a program resource, the apparatus comprising:
a memory; and
a computer processor coupled to the memory and configured to:
determine whether to perform detection of memory leakage based on whether a current central processing unit occupancy rate is less than a first set threshold;
collect, at least once within each period of a plurality of periods of usage of a program resource, resource usage data for the program resource while a program using the program resource is running, wherein a number of times of collecting resource usage data is the same within each period of the plurality of periods;
determine, for any two periods of the plurality of periods and for each program running resource usage sample collected within a latter period, a difference value between the program running resource usage sample collected within the latter period and a corresponding program running resource usage sample collected within a former period, wherein a first time difference between time when collection is performed each time within the latter period and start time of the latter period and a second time difference between time when collection is performed for the former period and start time of the former period fall within a preset range; and
determine whether there is a leak of the program resource according to a difference between a total number of difference values greater than 0 and a total number of difference values less than 0 among the determined difference values, wherein the computer processor is configured to determine that there is the leak of the programming resource when the difference between the total number of difference values greater than 0 and the total number of difference values less than 0 is greater than a second set threshold.

24. The apparatus according to claim 23, wherein the preset range is at least one of a duration range smaller than a minimum time interval among time intervals between every two adjacent times of collection within the former period and a duration range smaller than a minimum time interval among time intervals between every two adjacent times of collection within the latter period.

25. The apparatus according to claim 23, wherein a range of the second set threshold is greater than or equal to 0, and is less than or equal to 70% of a sum of the total number of difference values greater than 0 and the total number of difference values less than 0 among the determined difference values.

26. The apparatus according to claim 23, wherein the computer processor is configured to:
determine a statistic Z of the difference between the total number of difference values greater than 0 and the total number of difference values less than 0; and
determine that there is the leak of the program resource when Z is greater than a set threshold.

27. The apparatus according to claim 26, wherein the computer processor is configured to determine the statistic Z of the difference S' between the total number of difference values greater than 0 and the total number of difference values less than 0 according to the following formula:
when $$n \geq 10, Z = \frac{S'}{[VAR(S')]^{1/2}},$$

wherein n is the number of the plurality of periods; otherwise, $$Z = \begin{cases} \frac{(S'-1)}{[VAR(S')]^{1/2}}, & S' > 0 \\ 0, & S' = 0, \\ \frac{(S'+1)}{[VAR(S')]^{1/2}}, & S' < 0 \end{cases}$$

wherein $$S_i = \sum_{k=1}^{n-1} \sum_{l=k+1}^{n} \text{sgn}(R_{il} - R_{ik}),$$

$$S' = \sum_{i=1}^{m} S_i,$$

$$VAR(S') = \sum_{i=1}^{m} VAR(S_i),$$

$R_{ik}$ is resource usage data collected for an $i^{th}$ time within a $k^{th}$ period of the plurality of periods, $R_{il}$ is resource usage data collected for an $i^{th}$ time within a 1st period of the plurality of periods, and m is the number of times of collecting resource usage data within one period of the plurality of periods.

28. The apparatus according to claim 26, wherein the second set threshold is a quantile value determined according to a probability distribution of the statistic Z.

29. A method for predicting usage of a program resource, the method comprising:
collecting resource usage data at least once within each period of a plurality of periods of usage of a program resource;
decomposing the collected resource usage data into different resource components including a seasonal component, wherein the different resource components are constituent parts that are obtained by decomposing the collected resource usage data;
determining a plurality of prediction functions for the different resource components, wherein the plurality of prediction functions comprises a prediction function for the seasonal component, wherein the prediction function for the seasonal component is an $i^{th}$ data point of the seasonal component, wherein i=t mod T, wherein t is prediction time, and T represents a duration of each period of the plurality of periods;
determining an overall prediction function for the program resource according to the plurality of prediction functions by adding the plurality of prediction functions; and
predicting the usage of the program resource based on the overall prediction function, wherein predicting the usage includes at least one of predicting program resource usage at a future set time, predicting when the program resource will be exhausted, or predicting when program running resource usage will reach a set threshold in the future.

30. The method according to claim 29, wherein decomposing the collected resource usage data into the different resource components comprises at least one of:
decomposing the collected resource usage data into the seasonal component and a random component reflecting a random variation in program running resource usage; or
decomposing the collected resource usage data into a trend component reflecting a variation trend of program running resource usage, the seasonal component, and a random component reflecting a random variation in the program running resource usage.

31. The method according to claim 30, wherein a prediction function for the trend component is a linear function or a nonlinear function that uses prediction time as an independent variable and is obtained by performing linear fitting or nonlinear fitting on data contained in the trend component, wherein a prediction function for the random component is a constant, and the constant is an upper quantile of the random component.

32. The method according to claim 29, wherein the different resource components further comprise a trend component.

33. The method according to claim 32, wherein the overall prediction function for the program resource is determined according to the following formula:

$$R_t=(a+bt)+S_i+(\mu+k\sigma),$$

wherein in the formula, $R_t$ is the overall prediction function for the program resource; (a+bt) is a prediction function for a trend component, wherein a and b are constants; wherein $S_i$ is the prediction function for the seasonal component; and ($\mu+k\sigma$) is a prediction function for a random component, wherein $\mu$ is a mean value of data contained in the random component, $\sigma$ is a standard deviation of data contained in the random component, k is a constant, and a range of k is (0, 6].

34. The method according to claim 29, wherein the different resource components comprise a random component, and wherein a prediction function for the random component is an upper confidence limit determined according to a mean value and a standard deviation of data contained in the random component.

35. The method according to claim 34, wherein, when the different resource components comprise a trend component, the seasonal component, and the random component, the overall prediction function for the program resource is determined according to the following formula:

$$R_t=(a+bt)+S_i+(\mu+k\sigma),$$

wherein in the formula, $R_t$ is the overall prediction function for the program resource; (a+bt) is the prediction function for the trend component, wherein a and b are constants; wherein $S_i$ is the prediction function for the seasonal component; and ($\mu+k\sigma$) is the prediction function for the random component, wherein $\mu$ is a mean value of data contained in the random component, $\sigma$ is a standard deviation of data contained in the random component, and k is a constant.

36. The method according to claim 29, further comprising performing the decomposing based on determining that a central processing unit occupancy rate is less than a second set threshold.

37. The method according to claim 29, wherein a number of times of collecting resource usage data is the same within each period of the plurality of periods.

38. An apparatus for predicting usage of a program resource, the apparatus comprising:
a computer processor configured to:
collect, at least once within each period of a plurality of periods of usage of a program resource, resource usage data for the program resource while a program using the program resource is running;
decompose the resource usage data collected for the plurality of periods into a trend component reflecting a variation trend of program resource usage, a seasonal component reflecting a periodic variation in program resource usage, and a random component reflecting a random variation in program resource usage;
determine a first prediction function for the trend component, a second prediction function for the seasonal component, and a third prediction function for the random component, wherein the second prediction function for the seasonal component is an $i^{th}$ data point of the seasonal component, wherein i=t mod T, wherein t is prediction time, and T is a duration of each period of the plurality of periods;
add the first prediction function, the second prediction function, and the third prediction function to determine an overall prediction function for the program resource; and
predict usage of the program resource based on the overall prediction function, wherein the computer processor is configured to, according to the overall prediction function, predict at least one of program running resource usage at a future set time, a time when the program resource will be exhausted, or a time when program running resource usage will reach a set threshold in the future.

39. The apparatus according to claim 38, wherein the computer processor is further configured to initiate decomposition of the resource usage data based on determining that a central processing unit occupancy rate is less than a second set threshold.

40. The apparatus according to claim 39, wherein the first prediction function for the trend component is a linear function or a nonlinear function that uses prediction time as an independent variable and is obtained by performing linear fitting or nonlinear fitting on data contained in the trend component, and wherein the third prediction function for the random component is a constant, and the constant is an upper quantile of the random component.

41. The apparatus according to claim 38, wherein the computer processor is configured to initiate decomposition of the resource usage data based on determining that a current memory occupancy rate is not less than a second set threshold.

42. The apparatus according to claim 41, wherein, when the computer processor is configured to determine the overall prediction function for the program resource according to the following formula:

$$R_t=(a+bt)+S_i+(\mu+k\sigma),$$

wherein in the formula, $R_t$ is the overall prediction function for the program resource, $(a+bt)$ is the first prediction function for the trend component, wherein a and b are constants, wherein $S_i$ is the second prediction function for the seasonal component, and $(\mu+k\alpha)$ is the third prediction function for the random component, and wherein $\mu$ is a mean value of data contained in the random component, $\sigma$ is a standard deviation of data contained in the random component, k is a constant, and a range of k is (0, 6].

43. The apparatus according to claim 38, wherein the third prediction function for the random component is an upper confidence limit determined according to a mean value and a standard deviation of data contained in the random component.

44. The apparatus according to claim 43, wherein the trend component is
(a+bt), wherein a and b are constants.

45. The apparatus according to claim 38, wherein the computer processor is further configured to initiate the decomposition based on determining that a current time falls within a set time range.

46. The apparatus according to claim 38, wherein a number of times of collecting resource usage data is the same within each period of the plurality of periods.

* * * * *

UNITED STATES PATENT AND TRADEMARK OFFICE
CERTIFICATE OF CORRECTION

PATENT NO. : 9,846,601 B2
APPLICATION NO. : 14/922595
DATED : December 19, 2017
INVENTOR(S) : Jinghui Li, Xuewen Gong and Jianqing Yuan It is certified that error appears in the above-identified patent and that said Letters Patent is hereby corrected as shown below:

On the Title Page

Page 2, Column 2, Line 11, under Other Publications should read:
Muskens, J., et al., "Prediction of Run-Time Resource Consumption in Multi-Task Component-Based Software System," Lecture Notes in Computer Science, 3054, 2004, pages 162-177.

In the Claims

Column 44; Line 31; Claim 9 should read:
b are constants; wherein $S_i$ is the second prediction Column 53; Line 17; Claim 42 should read:
The apparatus according to claim 41, wherein Column 54; Line 3; Claim 42 should read:
function for the seasonal component, and $(\mu+k\sigma)$ is the Signed and Sealed this
Third Day of July, 2018

Andrei Iancu
*Director of the United States Patent and Trademark Office*